United States Patent
Nomura et al.

(10) Patent No.: US 7,214,756 B2
(45) Date of Patent: *May 8, 2007

(54) PROTON CONDUCTING MEMBRANE, PROCESS FOR ITS PRODUCTION, AND FUEL CELLS MADE BY USING THE SAME

(75) Inventors: Shigeki Nomura, Tsukuba (JP); Toshiya Sugimoto, Tsukuba (JP); Masanori Nakamura, Tsukuba (JP); Kenji Yamauchi, Tsukuba (JP)

(73) Assignee: Sekisui Chemical Co., Ltd., Osaka (JP)

( * ) Notice: Subject to any disclaimer, the term of this patent is extended or adjusted under 35 U.S.C. 154(b) by 325 days.

This patent is subject to a terminal disclaimer.

(21) Appl. No.: 10/450,845

(22) PCT Filed: Oct. 29, 2002

(86) PCT No.: PCT/JP02/11242

§ 371 (c)(1),
(2), (4) Date: Oct. 21, 2003

(87) PCT Pub. No.: WO03/041091

PCT Pub. Date: May 15, 2003

(65) Prior Publication Data
US 2004/0062970 A1    Apr. 1, 2004

(30) Foreign Application Priority Data
Oct. 30, 2001  (JP) ............................ 2001-332977
Feb. 6, 2002   (JP) ............................ 2002-029781
Apr. 11, 2002  (JP) ............................ 2002-109493

(51) Int. Cl.
C08G 77/28  (2006.01)
(52) U.S. Cl. .................. 528/30; 528/35; 442/116; 429/46
(58) Field of Classification Search ............... 528/30, 528/35; 442/116; 429/46
See application file for complete search history.

(56) References Cited

U.S. PATENT DOCUMENTS 5,354,831 A * 10/1994 Panster et al. ............... 528/9
5,427,706 A * 6/1995 Kobayashi et al. ......... 252/78.3
5,532,399 A * 7/1996 Hager et al. ................ 556/428
5,679,482 A * 10/1997 Ehrenberg et al. .......... 429/249
6,841,601 B2 * 1/2005 Serpico et al. .............. 524/261
6,949,616 B2 * 9/2005 Jacob et al. ................. 528/32
2006/0263660 A1 * 11/2006 Takaoka et al. ............. 429/33

FOREIGN PATENT DOCUMENTS

| EP | 581296 A2 | 2/1994 |
| JP | 2001-35509 | 2/2001 |
| JP | 2002-309016 | 10/2002 |
| WO | WO99/62620 | 12/1999 |

OTHER PUBLICATIONS

Grant and Hackh's Chemical Dictionary, "membrane", 1987.*
Webster's Dictionary "membrane", 2006.*

* cited by examiner

Primary Examiner—Margaret G. Moore
(74) Attorney, Agent, or Firm—Armstrong, Kratz, Quintos, Hanson & Brooks, LLP

(57) ABSTRACT

The present invention provides relates to a crosslinkable, proton-conducting membrane having a crosslinked structure, excellent in heat resistance, durability, dimensional stability and fuel barrier characteristics, and showing excellent proton conductivity at high temperature, characterized by comprising (a) an organic/inorganic hybrid structure (A) covalently bonded to 2 or more silicon-oxygen crosslinks and, at the same time, having a carbon atom, and (b) an acid containing structure (B) having an acid group, covalently bonded to a silicon-oxygen crosslink and having an acidic group; and provides a fuel cell using the same membrane. The present invention also provides a method for producing the proton-conducting membrane, comprising steps of preparing a mixture containing an organic/inorganic hybrid, crosslinkable compound (C) and compound (D), the former having 2 or more crosslinkable silyl groups and carbon atoms each being bonded to the silyl group via the covalent bond and the latter having a crosslinkable silyl group and acid group, as the first step; forming the above mixture into a film as the second step; and hydrolyzing/condensing or only condensing the hydrolyzable silyl group contained in the mixture formed into the film to form a crosslinked structure as the third step.

20 Claims, 1 Drawing Sheet

PROTON CONDUCTING MEMBRANE, PROCESS FOR ITS PRODUCTION, AND FUEL CELLS MADE BY USING THE SAME

FIELD OF THE INVENTION

This invention relates to a proton (hydrogen ion)-conducting membrane, method for producing the same, and fuel cell using the same, more particularly the proton-conducting membrane, excellent in heat resistance, durability, dimensional stability and fuel barrier characteristics, and showing excellent proton conductivity at high temperature, method for producing the same, and fuel cell using the same, and, at the same time, the proton-conducting membrane for the direct fuel type fuel cell which is directly supplied with fuel, e.g., methanol or methane, method for producing the same, and fuel cell using the same.

BACKGROUND OF THE INVENTION

Recently, the fuel cell has been attracting attention as a power generating device of the next generation, which can contribute to solution of the problems related to environments and energy, now having been increasingly becoming serious social problems, because of its high power generation efficiency and compatibility with the environments.

Fuel cells generally fall into several categories by electrolyte type. Of these, a polymer electrolyte fuel cell (sometimes referred to as PEFC), being more compact and generating higher output than any other type, is considered to be a leading fuel cell type in the future for various purposes, e.g., small-size on-site facilities, and as power sources for movable applications (e.g., vehicles) and portable applications.

Thus, PEFCs have inherent advantages in principle, and are being extensively developed for commercialization. PEFCs normally use hydrogen as the fuel. Hydrogen is dissociated into proton (hydrogen ion) and electron in the presence of catalyst provided on the anode side. Of these, the electron is passed to the outside, where it is used as electricity, and circulated back to the system on PEFC's cathode side. On the other hand, the proton is passed to the proton conducting membrane (electrolyte membrane), through which it moves towards the cathode side. On the cathode side, the proton, electron recycled back from the outside and oxygen supplied from the outside are bonded to each other in the presence of catalyst, to produce water. Thus, a PEFC by itself is a very clean energy source which generates power while it is producing water from hydrogen and oxygen.

Hydrogen to be supplied to a fuel cell is normally produced by an adequate method, e.g., methanol reforming to extract hydrogen. However, the direct fuel type fuel cell has been also extensively developed. It is directly supplied with methanol or the like, from which the proton and electron are produced in the presence of catalyst, where water is normally used together with methanol.

In the fuel cell, the proton conducting membrane is responsible for transferring the proton produced on the anode to the cathode side. As described above, flow of the proton takes place in concert with that of the electron. It is therefore necessary to conduct a sufficient quantity of the proton at high speed, for the PEFC to produce high output (or high current density). Therefore, it is not too much to say that performance of the proton conducting membrane is a key to performance of the PEFC. The proton conducting membrane also works as the insulation film which electrically insulates the anode and cathode from each other and as the fuel barrier membrane which prevents the fuel to be supplied to the anode side from leaking to the cathode side, in addition to transferring the proton.

The proton conducting membranes for the current PEFCs are mainly of fluorine resin-based ones, with a perfluoroalkylene as the main skeleton, and partly with sulfonic acid group at the terminal of the perfluorovinyl ether side chains. Several types of these sulfonated fluorine resin-based membranes have been proposed, e.g., Nafion® membrane (Du Pont, U.S. Pat. No. 4,330,654), Dow membrane (Dow Chemical, Japanese Patent Application Laid-Open No.4-366137), Aciplex® membrane (Asahi Chemical Industries, Japanese Patent Application Laid-Open No.6-342665), and Flemion® membrane (Asahi Glass).

These fluorine resin-based membranes are considered to have a glass transition temperature (Tg) of around 130° C. under a humidified condition, under which they work. The so-called creep phenomenon occurs as temperature increases from the above level to cause problems, e.g., changed proton conducting structure in the membrane to prevent the membrane from stably exhibiting the proton conducting performance, and modification of the membrane to a swollen morphology, or jelly-like morphology to make it very fragile and possibly cause failure of the fuel cell.

For these reasons, the maximum allowable temperature for stable operation for extended periods is normally considered to be 80° C.

A fuel cell, depending on the chemical reaction for its working principle, has a higher energy efficiency when it operates at higher temperature. In other words, a fuel cell operating at higher temperature becomes more compact and lighter for the same output. Moreover, a fuel cell operating at high temperature allows utilization of its waste heat for cogeneration to produce power and heat, thus drastically enhancing its total energy efficiency. It is therefore considered that operating temperature of a fuel cell is desirably increased to a certain level, normally to 100° C. or higher, in particular 120° C. or higher.

The catalyst in service on the anode side may be deactivated by impurities in the hydrogen fuel (e.g., carbon monoxide), a phenomenon known as catalyst poisoning, when it is not sufficiently purified. This is a serious problem which can determine lifetime of the PEFC itself. It is known that the catalyst poisoning can be avoided when the fuel cell operates at sufficiently high temperature, and the cell is preferably operated at high temperature also from this point of view. Moreover, the active metals for the catalyst itself will not be limited to pure noble metals, e.g., platinum, but can be extended to alloys of various metals, when the fuel cell can operate at sufficiently high temperature. Therefore, operability at high temperature is advantageous also viewed from reducing cost and widening applicable resources.

For the direct fuel type fuel cell, various approaches to extract the proton and electron from the fuel directly and efficiently have been studied. It is a consensus that production of sufficient power is difficult at low temperature, and possible when temperature is increased to, e.g., 150° C. or higher.

Thus, operability of PEFCs at high temperature is demanded from various aspects. Nevertheless, however, its operating temperature is limited to 80° C. by the heat resistance consideration of the proton conducting membrane, as discussed above at present.

The reaction taking place in a fuel cell is exothermic in nature, by which is meant that temperature within the cell spontaneously increases as the cell starts to work. However, the PEFC must be cooled so as not to be exposed to high temperature of 80° C. or higher, as limited by the resistance of the proton conducting membrane to heat. It is normally cooled by a water-cooling system, and the PEFC's bipolar plate is devised to include such a system. This tends to increase size and weight of the PEFC as a whole, preventing it to fully exhibit its inherent characteristics of compactness and lightness. In particular, it is difficult for a water-cooling system as the simplest cooling means to effectively cool the cell, when its maximum allowable operating temperature is set at 80° C. If it is operable at 100° C. or higher, it should be effectively cooled by use of heat of vaporization of water, and water could be recycled for cooling to drastically reduce its quantity, leading to reduced size and weight of the cell. When a PEFC is used as the energy source for a vehicle, the radiator size and cooling water volume could be greatly reduced when the cell is controlled at 100° C. or higher, compared to when it is controlled at 80° C. Therefore, the PEFC operable at 100° C. or higher, i.e., the proton conducting membrane having a heat resistance of 100° C. or higher, is strongly in demand.

As described above, the PEFC operable at higher temperature, i.e., increased heat resistance of the proton conducting membrane, is strongly in demand viewed from various aspects, e.g., power generation efficiency, cogeneration efficiency, cost, resources and cooling efficiency. Nevertheless, however, the proton conducting membrane having a sufficient proton conductivity and resistance to heat has not been developed so far.

With these circumstances as the background, a variety of heat-resistant proton conducting membrane materials have been studied and proposed to increase operating temperature of PEFCs.

Some of more representative ones are heat-resistant aromatic-based polymers to replace the conventional fluorine-based membranes. These include polybenzimidazole (Japanese Patent Application Laid-Open No.9-110982), polyether sulfone (Japanese Patent Application Laid-Open Nos.10-21943 and 10-45913), and polyetheretherketone (Japanese Patent Application Laid-Open No.9-87510).

These aromatic-based polymers have an advantage of limited structural changes at high temperature. However, many of them have the aromatic structure directly incorporated with sulfonic acid or carboxylic acid group. They tend to suffer notable desulfonation or decarboxylation at high temperature, and are unsuitable for the membranes working at high temperature.

Moreover, many of these aromatic-based polymers have no ion-channel structure, as is the case with fluorine resin-based membranes. As a result, it is necessary to incorporate a large number of acid groups in these polymers, for them to sufficiently exhibit proton conductivity, causing problems, e.g., deterioration of membrane stability and stability to hot water, and, in some cases, dissolution of these polymers in hot water. Moreover, the membranes of these polymers tend to be notably swollen as a whole in the presence of water, causing various problems, e.g., high possibility of separation of the membrane from the electrode joint and broken membrane due to the stress produced at the joint in the membrane-electrode assembly, resulting from the dry and wet conditional cycles which change the membrane size, and possibility of deteriorated strength of the water-swollen membrane, leading to its failure. In addition, each of the aromatic polymers is very rigid in a dry condition, possibly causing damages and other problems while the membrane-electrode assembly is formed.

On the other hand, the following inorganic materials have been also proposed as the proton conducting materials. For example, Minami et al. incorporate a variety of acids in hydrolyzable silyl compounds to prepare inorganic proton conducting materials (Solid State Ionics, 74 (1994), pp.105). They stably show proton conductivity even at high temperature, but involve several problems; e.g., they tend to be cracked when made into a thin film, and difficult to handle and make them into a membrane-electrode assembly.

Several methods have been proposed to overcome these problems. For example, the proton conducting inorganic material is crushed to be mixed with an elastomer (Japanese Patent Application Laid-Open No.8-249923) or with a polymer containing sulfonic acid group (Japanese Patent Application Laid-Open No. 10-69817). However, these methods have their own problems. For example, the polymer as the binder for each of these methods is merely mixed with an inorganic crosslinked compound, and has basic thermal properties not much different from those of the polymer itself, with the result that it undergoes structural changes in a high temperature range, failing to stably exhibit proton conductivity, and its proton conductivity is generally not high.

A number of R & D efforts have been made for various electrolyte membranes to solve these problems involved in the conventional PEFCs. None of them, however, have succeeded in developing proton conducting membranes showing sufficient durability at high temperature (e.g., 100° C. or higher) and satisfying the mechanical and other properties.

In the direct methanol type fuel cell (sometimes referred to as DMFC) which works on methanol as the fuel in place of hydrogen, on the other hand, methanol directly comes into contact with the membrane. The sulfonated fluorine resin-based membrane, e.g., Nafion® membrane, now being used has a strong affinity for methanol, possibly causing problems which can lead to failure of the fuel cell when it absorbs methanol, e.g., swelling to a great extent and dissolution in methanol in some cases. Crossover of methanol to the oxygen electrode side can greatly reduce cell output. These problems are common also with the electrolyte membranes containing an aromatic ring. Therefore, the membranes developed so far are neither efficient nor durable also for DMFCs.

It is an object of the present invention to provide a proton conducting membrane, excellent in heat resistance, durability, dimensional stability and fuel barrier characteristics, and showing excellent proton conductivity at high temperature. It is another object of the present invention to provide a method for producing the same. It is still another object of the present invention to provide a fuel cell using the same.

DISCLOSURE OF THE INVENTION

The inventors of the present invention have found, after having extensively studied a variety of electrolyte membrane to solve the above problems, that an innovative organic/inorganic hybrid membrane unprecedentedly excellent in heat resistance, durability, dimensional stability and fuel barrier characteristics, and showing excellent proton conductivity even at high temperature can be obtained by including, as the essential components for the proton conducting membrane, a crosslinked structure of specific organic/norganic hybrid structure and acid-containing crosslinked structure. The present invention has been developed based on the above knowledge.

The first aspect of the present invention is a proton conducting membrane crosslinkable and having a crosslinked structure by the silicon-oxygen bond, wherein the proton conducting membrane comprises (a) an organic/inorganic hybrid structure (A) covalently bonded to 2 or more silicon-oxygen crosslinks and having a carbon atom, and (b) an acid containing structure (B) having an acid group, covalently bonded to a silicon-oxygen crosslink and having an acid group.

The second aspect of the present invention is the proton conducting membrane of the first aspect, wherein the organic/inorganic hybrid structure (A) is represented by the general formula (1):

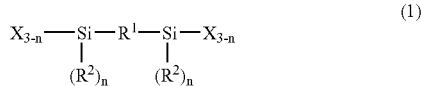

(wherein, X is an —O— bond or OH group involved in the crosslinking; $R^1$ is a carbon-containing group of 1 to 50 carbon atoms; $R^2$ is methyl, ethyl, propyl or phenyl group; and "n" is an integer of 0, 1 or 2).

The third aspect of the present invention is the proton conducting membrane of the second aspect, wherein $R^1$ in the general formula (1) is a hydrocarbon group.

The fourth aspect of the present invention is the proton conducting membrane of the third aspect, wherein $R^1$ in the general formula (1) has a structure represented by the general formula (3):

(wherein, "n" is an integer of 1 to 30).

The fifth aspect of the present invention is the proton conducting membrane of the fourth aspect, wherein the organic/inorganic hybrid structure (A) is represented by the general formula (4):

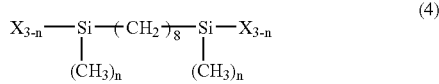

(wherein, X is an —O— bond or OH group involved in the crosslinking; and "n" is an integer of 0, 1 or 2).

The sixth aspect of the present invention is the proton conducting membrane of the second aspect, wherein $R^1$ in the general formula (1) has a siloxane structure.

The seventh aspect of the present invention is the proton conducting membrane of the sixth aspect, wherein $R^1$ in the general formula (1) is represented by the general formula (5):

(wherein, $R^5$ and $R^6$ are each methyl, ethyl, propyl or phenyl group, which may be the same or different; and "n" is an integer of 1 to 20).

The eighth aspect of the present invention is the proton conducting membrane of the first aspect, wherein the structure (B) containing an acid group is represented by the general formula (2):

(wherein, X is an —O— bond or OH group involved in the crosslinking; $R^3$ is a molecular chain group having at least one acid group; $R^4$ is methyl, ethyl, propyl or phenyl group; and "m" is an integer of 0, 1 or 2).

The ninth aspect of the present invention is the proton conducting membrane of the eighth aspect, wherein the acid group which $R^3$ in the general formula (2) has is sulfonic acid group.

The tenth aspect of the present invention is the proton conducting membrane of the ninth aspect, wherein $R^3$ in the general formula (2) is represented by the general formula (6):

(wherein, "n" is an integer of 1 to 20).

The 11$^{th}$ aspect of the present invention is the proton conducting membrane of the tenth aspect, wherein "n" in the general formula (6) is 3.

The 12$^{th}$ aspect of the present invention is the proton conducting membrane of one of the first to 11$^{th}$ aspects which is further composited with a fibrous material (I).

The 13$^{th}$ aspect of the present invention is the proton conducting membrane of the 12$^{th}$ aspect, wherein the fibrous material (I) is composed of a short fibrous material (J) anchor long fibrous material (K).

The 14$^{th}$ aspect of the present invention is the proton conducting membrane of the 12$^{th}$ aspect, wherein the fibrous material (I) is surface-treated with a silane coupling agent to have a proton-conductive surface.

The 15$^{th}$ aspect of the present invention is the proton conducting membrane of the 12$^{th}$ aspect, wherein the fibrous material (I) is composed of glass fibers.

The 16$^{th}$ aspect of the present invention is the proton conducting membrane of the 15$^{th}$ aspect, wherein the glass fibers are of alkali- or acid-resistant glass.

The 17$^{th}$ aspect of the present invention is the proton conducting membrane of the 13$^{th}$ aspect, wherein the long fibrous material (K) is composed of glass fibers in the form of woven fabric, non-woven fabric or glass fiber paper produced by a paper-making process.

The 18$^{th}$ aspect of the present invention is the proton conducting membrane of the 17$^{th}$ aspect, wherein the long fibrous material (K) is in the form of thirled, square-weave fabric.

The 19$^{th}$ aspect of the present invention is the proton conducting membrane of the 17$^{th}$ aspect, wherein the long fibrous material (K) has a thickness of 300 µm or less.

The 20$^{th}$ aspect of the present invention is the proton conducting membrane of the 12$^{th}$ aspect, wherein the short fibrous material (J) is incorporated at 1 to 75% by weight on the organic/inorganic hybrid structure (A) and acid-containing structure (B) totaled.

The 21$^{st}$ aspect of the present invention is the proton conducting membrane of the 13$^{th}$ aspect, wherein the short fibrous material (J) is composed of whiskers (L) and/or short glass fibers (M).

The 22$^{nd}$ aspect of the present invention is the proton conducting membrane of the 21$^{st}$ aspect, wherein the whiskers (L) have a diameter of 0.1 to 3 μm, length of 1 to 20 μm and aspect ratio of 5 to 100.

The 23$^{rd}$ aspect of the present invention is the proton conducting membrane of the 21$^{st}$ or 22$^{nd}$ aspect, wherein the whiskers (L) are of boron carbide, silicon carbide, alumina, aluminum borate, silicon nitride or $K_2O \cdot 6TiO_2$.

The 24$^{th}$ aspect of the present invention is a method for producing the proton conducting membrane of one of the first to 23$^{rd}$ aspect, comprising steps of preparing a mixture containing an organic/inorganic hybrid, crosslinkable compound (C) and compound (D), the former having 2 or more crosslinkable silyl groups and carbon atoms each being bonded to the silyl group via the covalent bond and the latter having a crosslinkable silyl group and acid group, as the first step; forming the above mixture into a film as the second step; and hydrolyzing/condensing or only condensing the hydrolyzable silyl group contained in the mixture formed into the film to form a crosslinked structure as the third step.

The 25$^{th}$ aspect of the present invention is a method for producing the proton conducting membrane of one of the first to 23$^{rd}$ aspect, comprising steps of preparing a mixture containing an organic/inorganic hybrid, crosslinkable compound (C) and compound (E), the former having 2 or more crosslinkable silyl groups and carbon atoms each being bonded to the silyl group via the covalent bond and the latter having a crosslinkable silyl group and mercapto group, as the first step; forming the above mixture into a film as the second step; hydrolyzing and condensing the hydrolyzable silyl group contained in the mixture formed into the film to form a crosslinked structure as the third step; and oxidation of the mercapto group in the crosslinked structure obtained in the third step into sulfonic acid as the fourth step.

The 26$^{th}$ aspect of the present invention is a method for producing the proton conducting membrane of one of the first to 23$^{rd}$ aspect, comprising steps of preparing a mixture containing an organic/inorganic hybrid, crosslinkable compound (C) and compound (F), the former having 2 or more crosslinkable silyl groups and carbon atoms each being bonded to the silyl group via the covalent bond and the latter having a crosslinkable silyl group and polysulfide group, as the first step; forming the above mixture into a film as the second step; hydrolyzing and condensing the hydrolyzable silyl group contained in the mixture formed into the film to form a crosslinked structure as the third step; and oxidation of the polysulfide group in the crosslinked structure obtained in the third step into sulfonic acid as the fourth step.

The 27$^{th}$ aspect of the present invention is a method for producing the proton conducting membrane of one of the first to 23$^{rd}$ aspect, comprising steps of preparing a mixture containing an organic/inorganic hybrid, crosslinkable compound (C) and compound (H), the former having 2 or more crosslinkable silyl groups and carbon atoms each being bonded to the silyl group via the covalent bond and the latter having a crosslinkable silyl group and halogen group, as the first step; forming the above mixture into a film as the second step; hydrolyzing and condensing the hydrolyzable silyl group contained in the mixture formed into the film to form a crosslinked structure as the third step; and substitution of the halogen group in the crosslinked structure obtained in the third step with sulfonic acid group as the fourth step.

The 28$^{th}$ aspect of the present invention is the method of one of the 24$^{th}$ to 27$^{th}$ aspects for producing the proton conducting membrane, wherein the organic/inorganic hybrid, crosslinkable compound (C) is represented by the general formula (7):

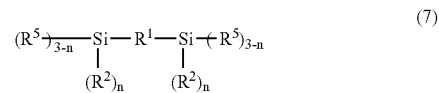

(wherein, $R^1$ is a carbon-containing group of 1 to 50 carbon atoms; $R^2$ is methyl, ethyl, propyl or phenyl group; $R^5$ is Cl, or $OCH_3$, $OC_2H_5$, $OC_6H_5$, OH or $OCOCH_3$ group; and "n" is 0, 1 or 2).

The 29$^{th}$ aspect of the present invention is the method of the 28$^{th}$ aspect for producing the proton conducting membrane, wherein $R^1$ in the general formula (7) is a hydrocarbon group.

The 30$^{th}$ aspect of the present invention is the method of the 29$^{th}$ aspect for producing the proton conducting membrane, wherein the organic/inorganic hybrid, crosslinkable compound (C) is represented by the general formula (8):

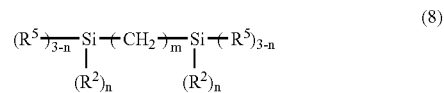

(wherein, $R^2$ is methyl, ethyl, propyl or phenyl group; $R^5$ is Cl, or $OCH_3$, $OC_2H_5$, $OC_6H_5$, OH or $OCOCH_3$ group; "m" is an integer of 1 to 30; and "n" is 0, 1 or 2).

The 31$^{st}$ aspect of the present invention is the method of the 30$^{th}$ aspect for producing the proton conducting membrane, wherein the organic/inorganic hybrid, crosslinkable compound (C) is represented by the general formula (9):

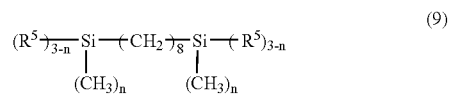

(wherein, $R^5$ is $OCH_3$ or $OC_2H_5$ group; and "n" is 0, 1 or 2).

The 32$^{nd}$ aspect of the present invention is the method of the 28$^{th}$ aspect for producing the proton conducting membrane, wherein the organic/inorganic hybrid, crosslinkable compound (C) is represented by the general formula (10):

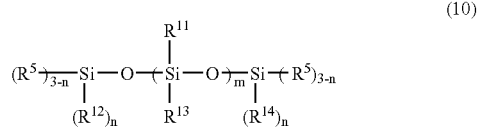

(wherein, $R^{11}$, $R^{12}$, $R^{13}$ and $R^{14}$ are each methyl, ethyl, propyl or phenyl group, which may be the same or different; $R^5$ is Cl, or $OCH_3$, $OC_2H_5$, $OC_6H_5$, OH or $OCOCH_3$ group; "m" is an integer of 1 to 30; and "n" is 0, 1 or 2).

The 33rd aspect of the present invention is the method of the 32nd aspect for producing the proton conducting membrane, wherein the organic/inorganic hybrid, crosslinkable compound (C) is represented by the general formula (11):

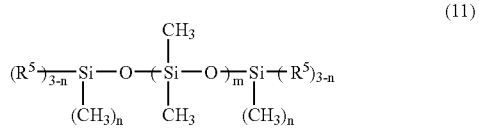
(11)

(wherein, $R^5$ is Cl, or $OCH_3$, $OC_2H_5$, $OC_6H_5$, OH or $OCOCH_3$ group; "m" is an integer of 1 to 30; and "n" is 0, 1 or 2).

The 34th aspect of the present invention is the method of the 24th aspect for producing the proton conducting membrane, wherein the acid containing compound (D) is represented by the general formula (12):

(12)

(wherein, $R^3$ is a molecular chain group having at least one acid group; $R^4$ is methyl, ethyl, propyl or phenyl group; $R^6$ is Cl, or $OCH_3$, $OC_2H_5$, $OC_6H_5$, OH or $OCOCH_3$ group; "m" is 0, 1 or 2).

The 35th aspect of the present invention is the method of the 34th aspect for producing the proton conducting membrane, wherein the acid containing compound (D) is sulfonic acid group.

The 36th aspect of the present invention is the method of the 35th aspect for producing the proton conducting membrane, wherein the acid containing compound (D) is represented by the general formula (13):

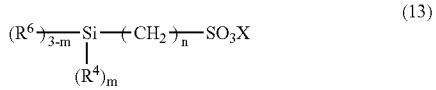
(13)

(wherein, $R^4$ is methyl, ethyl, propyl or phenyl group; $R^6$ is Cl, or $OCH_3$, $OC_2H_5$, $OC_6H_5$, OH or $OCOCH_3$ group; X is hydrogen, an alkali metal, alkyl group or ammonium group; "m" is 0, 1 or 2; and "n" is an integer of 1 to 20).

The 37th aspect of the present invention is the method of the 36th aspect for producing the proton conducting membrane, wherein "n" in the general formula (13) is 3.

The 38th aspect of the present invention is the method of the 24th aspect for producing the proton conducting membrane, wherein the organic/inorganic hybrid, crosslinkable compound (C) and acid containing compound (D) are incorporated in a mixing ratio of 9:1 to 1:9 by weight.

The 39th aspect of the present invention is the method of the 25th aspect for producing the proton conducting membrane, wherein the compound (E) having mercapto group is represented by the general formula (14):

(14)

(wherein, $R^7$ is a molecular chain group having at least one mercapto group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

The 40th aspect of the present invention is the method of the 39th aspect for producing the proton conducting membrane, wherein the compound (E) having mercapto group is represented by the general formula (15):

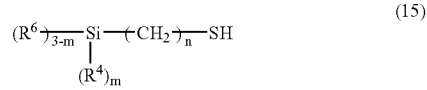
(15)

(wherein, $R^4$ is methyl, ethyl, propyl or phenyl group; $R^6$ is Cl, or $OCH_3$, $OC_2H_5$, $OC_6H_5$, OH or $OCOCH_3$ group; "m" is 0, 1 or 2; and "n" is an integer of 1 to 20).

The 41st aspect of the present invention is the method of the 25th aspect for producing the proton conducting membrane, wherein the compound (E) having mercapto group is represented by the general formula (16):

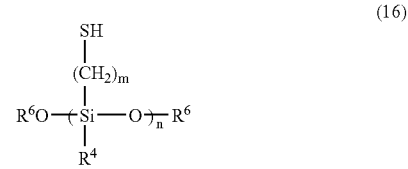
(16)

(wherein, $R^6$ is H, or $CH_3$, $C_2H_5$, $C_3H_7$ or $C_6H_5$ group; $R^4$ is $CH_3$, $C_2H_5$, $C_3H_7$, $C_6H_5$, OH, $OCH_3$, $OC_2H_5$, $OC_6H_5$ group, or O—Si bond; "m" is an integer of 1 to 20; and "n" is an integer of 3 to 500).

The 42nd aspect of the present invention is the method of the 41st aspect for producing the proton conducting membrane, wherein $R^4$, "m" and "n" in the general formula (16) are $OCH_3$ group, 3 and an integer of 3 to 100, respectively.

The 43rd aspect of the present invention is the method of the 41st aspect for producing the proton conducting membrane, wherein $R^4$, "m" and "n" in the general formula (16) are $CH_3$ group, 3 and an integer of 3 to 300, respectively.

The 44th aspect of the present invention is the method of the 25th aspect for producing the proton conducting membrane, wherein the compound (E) having mercapto group is represented by the general formula (17):

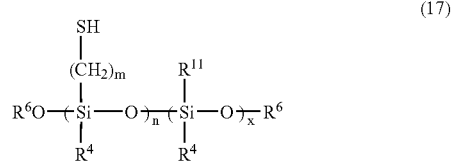
(17)

(wherein, $R^6$ is H, or $CH_3$, $C_2H_5$, $C_3H_7$ or $C_6H_5$ group; $R^4$ is $CH_3$, $C_2H_5$, $C_3H_7$, $C_6H_5$, OH, $OCH_3$, $OC_2H_5$ or $OC_6H_5$ group, $R^{11}$ is a substitute of 6 carbon atoms or less; "m" is an integer of 1 to 20; "n" is an integer of 3 to 500; and "n+x" is an integer of 500 or less, where the unit containing mercapto group and that containing $R^{11}$ may be present in a block or random form).

The 45th aspect of the present invention is the method of the 44th aspect for producing the proton conducting membrane, wherein $R^4$, "m" and "n+x" in the general formula (17) are $OCH_3$ group, 3 and an integer of 50 or less, respectively.

The 46th aspect of the present invention is the method of the 25th aspect for producing the proton conducting membrane, wherein the organic/inorganic hybrid, crosslinkable compound (C) and compound (E) having mercapto group are incorporated in a mixing ratio of 9:1 to 1:9 by weight.

The 47th aspect of the present invention is the method of the 26th aspect for producing the proton conducting membrane, wherein the compound (F) having a polysulfide group is represented by the general formula (18):

(18)

(wherein, $R^8$ is a molecular chain group having at least one polysulfide group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

The 48th aspect of the present invention is the method of the 47th aspect for producing the proton conducting membrane, wherein the compound (F) having a polysulfide group is represented by the general formula (19):

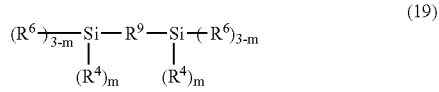

(19)

(wherein, $R^9$ is a molecular chain group having at least one polysulfide group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

The 49th aspect of the present invention is the method of the 48th aspect for producing the proton conducting membrane, wherein the compound (F) having a polysulfide group is represented by the general formula (20):

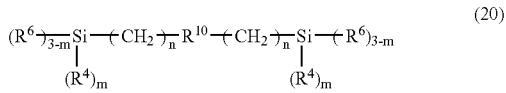

(20)

(wherein, $R^{10}$ is a polysulfide group; $R^4$ is methyl, ethyl, propyl or phenyl group; $R^6$ is Cl, or $OCH_3$, $OC_2H_5$, $OC_6H_5$, OH or $OCOCH_3$ group; "m" is 0, 1 or 2; and "n" is an integer of 1 to 6).

The 50th aspect of the present invention is the method of the 49th aspect for producing the proton conducting membrane, wherein "n" in the general formula (20) is 3.

The 51st aspect of the present invention is the method of one of the 47th to 50th aspects for producing the proton conducting membrane, wherein the polysulfide group is tetrasulfide group (—S—S—S—S—).

The 52nd aspect of the present invention is the method of one of the 47th to 50th aspects for producing the proton conducting membrane, wherein the polysulfide group is disulfide group (—S—S—).

The 53rd aspect of the present invention is the method of the 26th aspect for producing the proton conducting membrane, wherein the organic/inorganic hybrid, crosslinkable compound (C) and compound (F) having a polysulfide group are incorporated in a mixing ratio of 95:5 to 10:90 by weight.

The 54th aspect of the present invention is the method of one of the 24th to 27th aspects for producing the proton conducting membrane, wherein a crosslinking agent (G) of hydrolyzable, metallic compound is used for the first step.

The 55th aspect of the present invention is the method of the 54th aspect for producing the proton conducting membrane, wherein the crosslinking agent (G) is of a compound represented by the general formula (21):

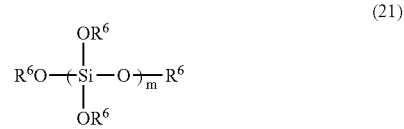

(21)

(wherein, $R^6$ is $CH_3$ or $C_2H_5$ group; and "m" is an integer of 1 to 300).

The 56th aspect of the present invention is the method of the 54th aspect for producing the proton conducting membrane, wherein the crosslinking agent (G) is of a hydrolyzable, metallic compound having Ti, Zr or Al.

The 57th aspect of the present invention is the method of the 27th aspect for producing the proton conducting membrane, wherein the compound (H) having a halogen group is represented by the general formula (22):

(22)

(wherein, $R^{12}$ is a molecular chain group having at least one halogen group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

The 58th aspect of the present invention is the method of the 57th aspect for producing the proton conducting membrane, wherein the compound (H) having a halogen group is represented by the general formula (23):

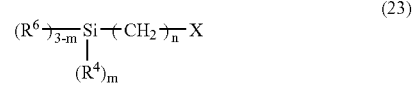

(23)

(wherein, $R^4$ is methyl, ethyl, propyl or phenyl group; $R^6$ is Cl, or $OCH_3$, $OC_2H_5$, $OC_6H_5$, OH or $OCOCH_3$ group; X is Cl, Br or I; "n" is an integer of 1 to 20; and "m" is 0, 1 or 2).

The 59th aspect of the present invention is the method of the 27th aspect for producing the proton conducting membrane, wherein the organic/inorganic hybrid, crosslinkable compound (C) and compound (H) having a halogen group are incorporated in a mixing ratio of 9:1 to 1:9 by weight.

The 60th aspect of the present invention is the method of one of the 24th to 27th aspects for producing the proton conducting membrane, wherein a step for aging at 100 to 300° C. is included as a post-treatment step.

The 61$^{st}$ aspect of the present invention is the method of one of the 24$^{th}$ to 27$^{th}$ aspects for producing the proton conducting membrane, wherein the short fibrous material (J) is incorporated in the mixture in the first step, when it is incorporated as the fibrous material (I) to be composited with the proton-conducting membrane.

The 62$^{nd}$ aspect of the present invention is the method of one of the 49$^{th}$ to 60$^{th}$ aspects for producing the proton conducting membrane, wherein the long fibrous material (K) is loaded in the second step with the mixture obtained in the first step, when it is incorporated as the fibrous material (I) in the form of sheet to be composited with the proton-conducting membrane.

The 63$^{rd}$ aspect of the present invention is a fuel cell which uses the proton conducting membrane of one of the first to 23$^{rd}$ aspects.

BEST MODE FOR CARRYING OUT THE INVENTION

Figure 1:
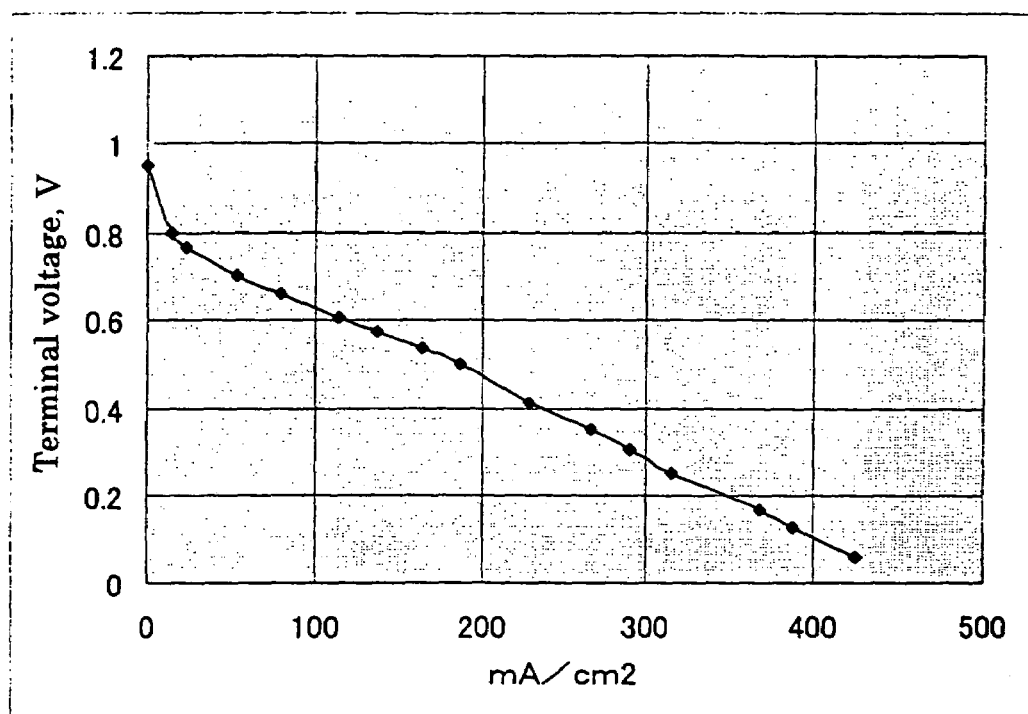
FIG. 1 is a voltage-current curve for illustrating the output produced by the fuel cell of the present invention.

The present invention is described in detail for each aspect.

1. Structure of the Proton-Conducting Membrane

The proton-conducting membrane of the present invention has a crosslinked structure. By contrast, the conventional proton-conducting membrane of fluorine-based resin or polymeric material with an aromatic molecular structure in the main chain has no such a structure. As a result, a proton-conducting membrane of the conventional polymeric material is structurally changed significantly at high temperature due to the creep phenomenon or the like. Therefore, a fuel cell which uses the membrane exposed to high temperature is operationally unstable.

For example, a Nafion® (Du Pont) membrane, which represents the fluorine-based resin membranes, is greatly swollen under a wet condition to lose strength, although strong and flexible under a dry condition. A membrane which shows a significantly increased size under a wet condition from that under a dry condition causes various problems, e.g., difficulty in making a membrane-electrode assembly (sometimes referred to as MEA), and possible failure of the membrane or MEA while the fuel cell is working, because the membrane invariably expands or contracts under changed temperature and humidity conditions within the fuel cell as a result of the changed operational conditions. Moreover, failure of the membrane is possibly caused not only by the dimensional change but also by a differential pressure produced within the cell, because of its decreased strength under a wet condition.

When exposed to high temperature, e.g., around 150° C., for extended periods, the membrane will become jelly-like and useless for a fuel cell, because it greatly loses its strength and is itself broken. Even at around 120° C., the creep phenomenon occurs to modify it into a swollen state and greatly decrease its strength. Once modified, it will become hard and fragile when dried under changed operating conditions of the fuel cell. This possibly causes its failure and cracking, and eventually failure of the membrane-electrode assembly itself. These phenomena can similarly occur in the case of the membrane with an aromatic molecular structure in the main chain.

However, these problems can be solved by introducing a crosslinked structure in the membrane. In other words, the membrane having a crosslinked structure at a sufficient crosslinking density will no longer undergo significant changes in size and hence in strength under dry and wet conditional cycles.

The crosslinked structure can be formed by incorporating, e.g., epoxy, crosslinkable acrylic, melamine or unsaturated polyester resin. However, such a crosslinked structure is not sufficiently stable for extended periods for a fuel cell membrane, which is exposed to high temperature and humidity under a strongly acidic condition resulting from the presence of proton.

On the other hand, a metal-oxygen bond is stable under strongly acidic and high temperature/humidity conditions, and can be suitably used for the crosslinked structure within a fuel cell membrane. These bonds include silicon-oxygen, aluminum-oxygen, titanium-oxygen and zirconium oxygen bonds, of which silicon-oxygen bond is particularly preferable because it can be easily obtained and is inexpensive.

The crosslinked structure for the proton-conducting membrane of the present invention is mainly formed by silicon-oxygen bond. However, the other metal-oxygen bonds may be used, so long as they make no sacrifice of the cost and easiness of the production process. Moreover, silicon-oxygen bond may be used in combination with phosphorus-oxygen or boron-oxygen bond. When silicon-oxygen bond is used in combination with another metal-oxygen bond, the ratio of silicon to the other metal in the crosslinked structure is generally 50% by mol or more per 100% by mol of the total metallic atoms, although not determined sweepingly.

2. Organic/inorganic hybrid structure (A)

An organic/inorganic hybrid structure (A) covalently bonded to 2 or more silicon-oxygen crosslinks and containing carbon atom is used as the basic crosslinked structure for the proton-conducting membrane of the present invention.

Proton-conducting membranes including a silicon-oxygen bond have been studied for fuel cells. Each of these membranes is produced by the sol-gel process involving hydrolysis/condensation using tetraethoxy or tetramethoxy silane as the starting material. For example, the process proposed by Minami et al., described earlier, gives a proton-conducting membrane durable to high temperature (Solid State Ionics, 74 (1994), P. 105).

However, the sol-gel process involving only an inorganic material gives a glassy, hard, fragile membrane. A proton-conducting membrane is generally produced to have a thickness of 100 μm or less. A glassy, fragile membrane 100 μm or less in thickness will be easily cracked, when it is assembled with an electrode, incorporated in a fuel cell or working in the fuel cell. It is therefore difficult to use such a membrane for a fuel cell. It is in itself difficult to produce a defect-free membrane having a sufficient size (e.g., 10 square inches) to be assembled into a fuel cell.

Compositing with a flexible structure is effective for overcoming these fragility-related problems. Some fuel cell membranes include a crosslink of oxygen with a mono- or di-alkyl-substituted silicon, produced from methyltriethoxy silane or the like as the starting compound having an alkyl-substituted, hydrolyzable silyl group, noting heat resistance of an inorganic material and attempting to impart flexibility of an organic material to the membrane.

For example, Poinsignon et al. propose a process for condensing benzyltriethoxysilane, n-hexyltriethoxysilane or triethoxysilane (Electrochimica Acta, 37 (1992), P.1615). It is reported that the membrane produced by this process, although having flexibility to some extent, is soluble in water, when benzyltriethoxysilane, for example, is sulfonated, because of greatly reduced substantial crosslinking density. They attempt to further incorporate the crosslinked structure to prevent the above problem. However, the resultant membrane becomes fragile, and fails to achieve originally intended flexibility. In other words, it is impossible to produce a flexible membrane when an alkyl- or aryl-substituted silicon-oxygen crosslinked structure has the crosslink only at one terminal.

On the other hand, the proton-conducting membrane of the present invention includes the organic/inorganic hybrid structure (A), described above, as the basic crosslinked structure. The membrane including such a compound can have adjusted membrane properties, beginning with flexibility, by designing the molecular structure between the crosslinked structures. Fuel gas barrier capacity as one of the important properties for a fuel cell membrane can be adjusted by controlling crosslinking density and structure.

The concrete structure of the organic/inorganic hybrid structure (A) is described.

First, the structures having 3 or more crosslinked sites are described. These are some of the examples which can be easily obtained commercially or synthesized, and the present invention is by no means limited them. The term "crosslinkable silyl group" described herein is a silicon oxide group bonded to a crosslinking group via a covalent bond. For example, those having 3 crosslinked sites include 1,3,5-tris (crosslinkable silylethyl)-2,4,6-trimethyl benzene, tris (p-crosslinkable silylpropylphenyl)amine and tris (p-crosslinkable silylpropyl)isocyanurate. The hydrolyzable silyl compounds as the starting materials for these compounds are supplied by Gelest, Inc.

Moreover, for 1,2,4-tri(crosslinkable silylethyl)cyclohexane, tri(crosslinkable silylpropyl)amine and the like, the crosslinkable, starting compounds can be produced by hydrosilylation of trialkoxysilane, dialkoxyalkylsilane or monoalkoxydialkylsilane with a commercial reagent, e.g., 1,2,4-trivinyl cyclohexane, triallylamine or the like (e.g., those supplied by Aldrich) in the presence of chloroplatinic acid as a catalyst.

The crosslinkable, starting compounds can be produced by the reaction with, e.g., 3-triethoxysilylpropylisocyanate or the like for those having 3 hydroxyl or amino groups in the molecular structure, and by the reaction with, e.g., 3-triethoxysilylpropylamine for those having a reactive group, e.g., isocyanate, in the molecular structure.

Next, those having 4 crosslinked sites include tetrakis (crosslinkable silylpropyl)silane and tetrakis(crosslinkable silylethyl)silane, for which the starting materials can be easily produced by the similar hydrosilylation of corresponding tetraallylsilane (Gelest, Inc.) and tetravinylsilane (Aldrich) as the commercial products. In other words, it is sufficiently possible to synthesize the other structures having 3 or 4 crosslinked sites. Moreover, those having 5 or more crosslinked sites can be also synthesized by use of the so-called dendrimer or the like as the starting material. The still other examples include those structures from a starting material having a hydrolyzable silyl group in the polymeric side chain. Those having 2 or more hydrolyzable silyl groups in the straight-chain or cyclic siloxane side chain may be also used.

Those having 2 crosslinked sites in the molecular chain include the structures having a crosslinkable silyl group in the middle of the molecular chain. Those represented by the general formula (1) are more preferable for their availability:

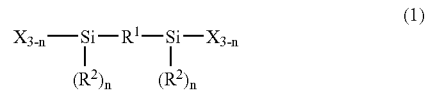

(wherein, X is an —O— bond or OH group involved in the crosslinking; $R^1$ is a carbon-containing group of 1 to 50 carbon atoms; $R^2$ is methyl, ethyl, propyl or phenyl group; and "n" is an integer of 0, 1 or 2).

Some of the crosslinkable precursors for these structures are commercially available and directly used. They can be synthesized from those precursors having an unsaturated bond by hydrosilylation of the corresponding silyl compounds. They can be similarly synthesized when the precursors have hydroxyl, amino group or the like.

Popall et al. propose a similar system, which is a coating material with a silicon-oxygen crosslink at one terminal and another crosslink with epoxy or methacrylic group at the other terminal (Electrochimica Acta, 43 (1998), P.1301). These crosslinked structures, however, have the ether or ester bond amenable to hydrolysis under the high temperature/humidity and strongly acidic conditions produced while the fuel cell is working, the former bond being produced by the epoxy crosslinking and the latter left by the methacrylic bond crosslinking. The crosslinked structure should be highly resistant to acid and heat, e.g., that formed by a crosslinking group such as Si—O, like the one used for the present invention, to be used for a fuel cell. The mixed system of organic and inorganic crosslinks proposed by Popall et al. is intended for a patterning material but not for a fuel cell membrane. The one for a patterning material is similar to that for a fuel cell, but technically quite different, because of different objects and functions.

X in the general formula (1) is a bond involved in the crosslinking or silanol group which can be involved in the crosslinking. Number of the bonds or groups in the structure is 3, 2 or 1 (i.e., "n" is 0, 1 or 2).

$R^1$ is a carbon-containing group for controlling membrane properties, e.g., flexibility. The membrane will be hard and fragile when it contains no carbon atom. It will be insufficiently crosslinked and sufficient heat resistance will be no longer expected, when the chain has more than 50 carbon atoms.

The preferred embodiments of $R^1$ include hydrocarbon groups. $R^1$ may contain a hetero atom, but may be decomposed when exposed to an acid or heat. By contrast, a hydrocarbon compound is resistant to an acid, and very stable. The hydrocarbons include alkylene and aromatic-containing chains.

Of these, particularly preferable ones include straight-chain molecular chains composed of polymethylene chain free of branch or the like. They are represented, e.g., by the general formula (3):

(wherein, "n" is an integer of 1 to 30).

When $R^1$ is branched, for example, the methine hydrogen in the branch may be pulled out by an active radical or the like produced while the fuel cell is working to cut the bond which connects the crosslinks to each other. When it contains an aromatic compound, mainly the benzyl site may become an active site to trigger decomposition or another reaction, to possibly deteriorate stability of the membrane. $R^1$ containing a hydrocarbon compound having an aromatic ring is more stable than that having a hetero atom, but possibility of decomposition cannot be ruled out when the fuel cell works for extended periods.

By contrast, when $R^1$ is a straight-chain polymethylene chain, it makes the structure stable to attacks by an acid, radical or the like. Such a structure is suitable for a heat-resistant fuel cell membrane. The straight-chain polymethylene chain is not only stable but also of flexible structure, and can impart adequate flexibility to the membrane. Therefore, the membrane can be adjusted for denseness, the adjustment mainly achieved by molecular length of the polymethylene chain.

Various types of bis (hydrolyzable silyl) polymethylene are known to serve as the starting compounds for introducing the Si—O crosslinks into the polymethylene chain at both terminals. The polymethylene of ethylene, hexamethylene, octamethylene, and nonamethylene are commercialized by Gelest, Inc. Moreover, the starting compounds with $R^1$ corresponding to tetramethylene, decamethylene, tetradecamethylene, hexadecamethylene or docosamethylene can be easily produced by hydrosilylation of the corresponding compound with unsaturated bonds at both terminals, e.g., 1,3-butadiene, 1,9-decadiene, 1,13-tetradecadiene, 1,15-hexadecadiene or 1,21-docosadiene. Any polymethylene chain can be synthesized, so long as it has 30 carbon atoms or less.

The polymethylene having a molecular length of 1 to 30 can give the membrane which satisfies all of the properties of heat resistance, flexibility and fuel gas barrier characteristics. The membrane tends to be more flexible as methylene molecular chain length increases, and tougher as it decreases, although not sweepingly generalized, because these properties are also affected by number of the crosslinking groups. Of these polymethylenes, those having the structure with 8 methylenes connected in series, represented by the general formula (4), are more preferable for their availability:

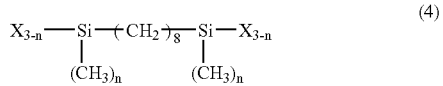

(4)

(wherein, X is an —O— bond or OH group involved in the crosslinking; and "n" is an integer of 0, 1 or 2).

Those polymethylene structures with the Si—O crosslinks at both terminals are very stable and useful as the basic crosslinked structures for proton-conducting membranes for fuel cells.

Like a polymethylene, a siloxane compound is also useful for $R^1$ in the general formula (1), because it is high in resistance to heat and acid and can give a flexible membrane. The siloxane compound has the Si—O bond in the main chain and an organic group, e.g., alkyl group, in the side chain.

The siloxane compound may have a branched or cyclic structure, or the like, but is particularly preferably of straight-chain structure for its high flexibility. These straight-chain siloxane compounds have a structure represented by the general formula (5):

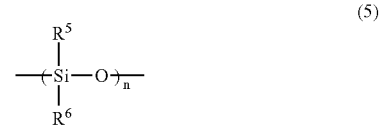

(5)

(wherein, $R^5$ and $R^6$ are each methyl, ethyl, propyl or phenyl group, which may be the same or different; and "n" is an integer of 1 to 20).

$R^5$ and $R^6$ are generally methyl group for the dimethyl siloxane structure. However, those having ethyl, propyl or phenyl group to increase solubility can be also suitably used. These siloxane compounds can be produced from those having alkoxysilyl, silanol, halogenated silyl or silanolate group at the corresponding siloxane terminal as the starting compounds, which are commercialized by, e.g., Gelest, Inc.

The siloxane compound with silanol group at the terminal may be reacted with tetraethoxysilane, tetraacetoxysilane or hydrolyzable metallic compound of Ti, Zr, Al or the like, to be more crosslinkable beforehand.

The structure of the straight-chain siloxane with the Si—O crosslink at the terminal is very stable and useful as the basic crosslinked structure for proton-conducting membranes for fuel cells.

The organic/inorganic hybrid structure (A) maybe composed of 2 or more structure types. For example, it may be a mixture of organic/inorganic hybrid structure having a hydrocarbon compound and that having a siloxane compound. Such a mixture can be adjusted for crosslinking density or the like by the composition, and hence for membrane flexibility, gas barrier characteristics or the like. The membrane properties can be also adjusted by mixing organic/inorganic hybrid structures of different organic chain length, crosslinking group number, substituent type or the like.

3. Structure (B) Containing Acid Group

A proton-conducting membrane for fuel cells is generally required to efficiently conducting proton. Proton-conducting efficiency of the membrane basically depends on proton concentration in the membrane, content of the conducting medium (e.g., water) and proton mobility, although varying to some extent depending on the conducting mechanism involved. In other words, it is preferable that proton is present at a high concentration in the membrane. For proton to be present at a high concentration in the membrane, it is necessary to distribute acid groups as much as possible in the membrane.

When the acid group is extracted and released out of the membrane in the presence of water supplied to the fuel cell or of water or the like produced while the fuel cell is working, proton concentration in the membrane decreases to deteriorate its proton conductivity. Therefore, some measures are preferably taken to securely hold the acid in the membrane stably for extended periods, e.g., by covalently bonding the acid instead of ionic interactions. Nafion$^R$, for example, contains sulfonic acid via covalent bond, and it is known that the sulfonic acid group itself is stably kept in the membrane for extended periods, although the membrane may be deteriorated by the creep phenomenon.

In the proton-conducting membrane of the present invention, a compound containing an acid group is bound to the silicon-oxygen crosslink via covalent bond. More specifically, proton conductivity of the membrane can be stably secured for extended periods by strongly binding the acid to the organic/inorganic hybrid structure (A) as the basic structure for the membrane. The present invention is particularly characterized by combining the acid-containing structure (B) with the organic/inorganic hybrid structure (A), which can impart heat resistance and flexibility to the membrane. As a result, the membrane is resistant to heat and good in membrane properties, e.g., flexibility, and stably holds the acid.

The structure (B) containing an acid group is not limited, so long as it has an acid group and is bound to the crosslinked structure in the membrane via the Si—O bond. However, it has preferably a structure by the general formula (2):

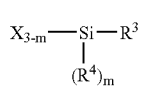

(2)

(wherein, X is an —O— bond or OH group involved in the crosslinking; $R^3$ is a molecular chain group having at least one acid group; $R^4$ is methyl, ethyl, propyl or phenyl group; and "m" is an integer of 0, 1 or 2).

$R^3$ has at least one acid group and is bound to the crosslinking group via a covalent bond. Various acid groups are useful for the present invention. For example, they include sulfonic, phosphonic, carboxylic, sulfuric, phosphoric and boric acid, of which sulfonic acid is particularly preferable, because it has a low pKa value, can secure proton in the membrane at a sufficiently high concentration and is thermally stable.

When the acid group is sulfonic acid, $R^3$ preferably has a structure represented by the general formula (6):

(6)

(wherein, "n" is an integer of 1 to 20).

The structure between sulfonic acid and crosslinked structure is not limited, but should be excellent in resistance to heat, acid and oxidation among others for the object of the present invention. The polymethylene chain represented by the general formula (6) is one of the structures which satisfy the above requirements. In the structure represented by the general formula (6), the polymethylene chain is not branched, and the sulfonic acid group is present at the terminal of the polymethylene chain.

When the polymethylene chain is branched, the methine structure in the branch is amenable to oxidation or radical reaction, with the result that sulfonic acid may be released out of the membrane. When sulfonic acid is present in the polymethylene chain not at the terminal but in the middle, the portion bound to sulfonic acid may be methine-structured, with the result that sulfonic acid may be similarly eliminated/released by oxidation or the like.

Moreover, the structure in which sulfonic acid is bound to the crosslinked structure is preferably free of aromatic ring. An aromatic ring is easily sulfonated. For example, Poinsignon et al. prepare a structure in which sulfonic acid is directly incorporated in the benzene ring by forming a crosslinked structure of benzyl trialkoxysilane beforehand and then sulfonating the structure (Electrochimica Acta, 37 (1992), P.1615, cited before). However, direct sulfonation of an aromatic compound involves a disadvantage that sulfonic acid is easily eliminated from the structure, although is easily synthesized. In other words, such a structure is easily desulfonated when exposed to high temperature/humidity conditions associated with operation of a fuel cell, for which the membrane of the present invention is developed, to lose conductivity. It is known that sulfone group is prepared from an aromatic ring via several methylene chains by addition of an adequate compound, e.g., 1,3-propane sulfone, instead of direct sulfonation (Ogata et al., Polymer Preprint, Japan, 46 (1997), P. 1867). In this case, however, methylene adjacent to the aromatic ring may become an active site (the so-called benzyl site) to cause elimination of the acid by decomposition or the like originating from the benzyl site. This can greatly reduce proton conductivity at a high possibility. Therefore, it is not suitable for the acid-bound structure for the present invention.

Based on the above considerations, the optimum structure of the structure (B) containing an acid group for the present invention is represented by the general formula (6), where the one having a silicon atom directly bound to sulfone group (i.e., "n" is 0) is amenable to hydrolysis and hence unsuitable for the present invention. On the other hand, the one having "n" larger than 20 is also undesirable, because it gives a membrane of insufficient crosslinking density. Therefore, "n" is in the range from 1 to 20, preferably 1 to 12.

Of these structures, the one having "n" of 3 is particularly preferable because it is easily obtained; 3-trihydroxysilyl-propylsulfonic acid, which can be used as the starting material, is commercialized by Gelest, Inc., and the synthesis process using allyl bromide as the starting compound is already established.

4. Ratio of the Organic/Inorganic Hybrid Structure (A) to the Acid-Containing Structure (B)

The ratio of the organic/inorganic hybrid structure (A) to the acid-containing structure (B) is not limited, so long as it is in the range defined for satisfying the required heat resistance, flexibility and proton conductivity of the membrane. Generally speaking, at an insufficient content of the organic/inorganic hybrid structure (A), sufficient flexibility and heat resistance of the membrane cannot be achieved. Moreover, the membrane may not be self-sustaining. At an insufficient content of the acid-containing structure (B), on the other hand, the membrane may have a very low proton conductivity.

The (A)/(B) ratio is normally in a range from 1:9 to 9:1, although varying depending on structure of each structure and process by which the membrane is produced.

5. Fibrous Material (I)

The proton-conducting membrane of the present invention has a three-dimensional silicon-oxygen structure. It is resistant to heat, swells and contracts to a limited extent with changed humidity, and is tough. However, it may be fragile when made into a thin film, and may be incorporated with a reinforcing agent. The reinforcing agent useful for the present invention is not limited, so long as it does not prevent proton conduction and exhibits an effect of reinforcing the membrane. It may be in the fibrous, fibril or porous membrane form. The reinforcing agents are represented by the fibrous material (I).

The fibrous material (I) should be resistant to high temperature and acid concentration within a fuel cell. Those suitably used for the present invention include fluorine resin represented by polytetrafluoroethylene, cyclic polyolefin resin, high-molecular-weight polyolefin and inorganic materials, e.g., glass as the materials resistant to these severe environments.

Of these, fluorine resin is particularly preferable as a reinforcing agent for the proton-conducting membrane of the present invention for its high chemical stability. Those fluorine resins useful for the fibrous material for the present invention include Tomoegawa Paper's P-50. Moreover, porous membranes, e.g., Advantech's H020A142C and Nihon Millipore's membrane filter JG, are also useful. These fluorine materials may not be always adhesive securely to a proton-conducting material. Therefore, they may be surface treated, as required, by a wet process with a silane coupling agent, or dry process, e.g., corona or plasma treatment.

The glass fiber material is highly adhesive to the organic/inorganic hybrid structure (A) and acid-containing structure (B). Silanol group, when left on the glass fiber surfaces, can react with the structures (A) and (B), to make the glass fibers highly fast adhesive to the structures (A) and (B). Therefore, it brings a desirable effect for the present invention.

Alkali- or acid-resistant glass is more preferable than common E glass for the fibrous material, because it is more resistant to acid, which is present at a high concentration within a fuel cell.

Glass is an inorganic material generally composed of $SiO_2$, $B_2O_3$, $P_2O_5$, $Al_2O_3$, among others, as the major ingredients, and normally incorporated with an alkali component, e.g., $Na_2O$ or $K_2O$, to decrease softening temperature.

Alkali-resistant glass may be incorporated with a $Ca_2O$ component to prevent flow of alkali, and means glass having a chemical formula represented by $Na_2O$—$ZrO_2$ ($TiO_2$)—$SiO_2$. It is accepted that increasing $ZrO_2$ content increases resistance to alkali.

Acid-resistant glass preferably contains an alkali component, e.g., $Na_2O$ or $K_2O$, at a lower content. For example, quartz glass mainly composed of $SiO_2$, or borosilicate glass mainly composed of $SiO_2$, $B_2O_3$ and the like are suitably used.

The fibrous material (I) may morphologically fall into short fibrous material (J) and long fibrous material (K). Each is described in detail.

The present invention may be incorporated with a short fibrous material (J) only, long fibrous material (K) only or combination thereof as the fibrous material (I).

The fibrous material (I), when composed of glass or another inorganic material, can be treated at high temperature or by oxidation to activate the surface. This surface treatment is preferable for the present invention, because it improves its adhesion to the organic/inorganic hybrid structure (A) and acid-containing structure (B).

The fibrous material may be also treated with a silane coupling agent, which can be selected from the commercial products in consideration of its adhesion to the organic/inorganic hybrid structure (A) and acid-containing structure (B).

The suitable silane coupling agent contains an acid group and can impart proton conductivity to the fibrous material (I) surface. These silane coupling agents include 3-trihydroxysilylpropanesulfonic acid. The fibrous material (I) may be also treated for silane coupling with a sulfur-containing compound, e.g., 3-mercaptopropyltriethoxysilane and then for oxidation, or treated with a halogenated silane coupling agent, e.g., 3-bromopropyltriethoxysilane and then treated to substitute the halogen group by sulfurous acid. The other common treatment methods with a silane coupling agent include drying and/or baking a mixture of alkoxysilane or halogenated silane and the fibrous material (I) after hydrolyzing the former to be compatible with the latter.

5.1 Short Fibrous Material (J)

The short fibrous material (J) is 1 to 1000 μm long, preferably 5 to 100 μm long.

The short fibrous material (J) is preferably in the form of short glass fibers (M) or whiskers (L). The short glass fibers (M) can be produced from glass fibers by an adequate method, e.g., crushing.

The whiskers (L) are fine fibers of crystalline structure, and used for reinforcing the membrane to prevent cracking. The whiskers preferably have dimensions of diameter: 0.1 to 3 μm, length: 1 to 20 μm and aspect ratio: 5 to 100, more preferably 10 to 50. When excessively fine, the whiskers will agglomerate with each other, and difficult to handle. When excessively coarse, they may not fully exhibit the reinforcing effect. The materials for the whiskers (L) include boron carbide, silicon carbide, alumina, aluminum borate, silicon nitride and $K_2O.6TiO_2$. The reinforcing agent preferably has a functional group (e.g., OH group), on the surface, which can trigger the silane coupling reaction, to have improved adhesion to the hardenable material which forms the silicon-oxygen bond. The whiskers (L) can have an activated surface when treated for oxidation on the surface.

When excessively incorporated, the whiskers (L) may not be dispersed sufficiently to possibly cause excessive permeation of the gas, and may decrease conductivity of the membrane. When incorporated insufficiently, they may not fully exhibit their effect. Therefore, they are incorporated at 1 to 75 parts by weight per 100 parts by weight of the organic/inorganic hybrid structure (A) and acid-containing structure (B) totaled.

The most simple method to incorporate the short fibrous material (J) into the proton-conducting membrane is mixing it with the organic/inorganic hybrid structure (A) and acid-containing structure (B) while the starting solution of these structures are prepared. They are preferably mixed by a homogenizer or ball mill, to strongly agitate them to prevent agglomeration. The mixture is preferably used immediately after it is prepared to prevent separation, or else treated to have a certain viscosity to prevent the mixture from being easily separated.

5.2 Long Fibrous Material (K)

The long fibrous material (K) is preferably 10 mm long or more and continuous, viewed from the reinforcing effect.

The preferable materials for the long fibrous material (K) include fluorine resin represented by polytetrafluoroethylene, and glass, in particular glass, for their excellent adhesion to the crosslinked structure (A).

The glass fibers are preferably, in particular, 10 mm long or more and continuous, viewed from the reinforcing effect. They are also preferably 3 to 20 μm in diameter, more preferably 9 to 13 μm. When finer than 3 μm, they tend to be scattered into air. Moreover, it is accepted that they can easily enter the blood tubes to injure human health. The fibers having a diameter larger than 20 μm are extremely stimulus to the human skin, and are not well distributed in the paper-making step, which is later described, to cause an uneven distribution.

The short glass fibers can be well dispersed when mixed and agitated with the starting materials for the structures (A) and (B). However, the long glass fibers may not be evenly distributed in the proton-conducting membrane of the present invention, unless they are dispersed beforehand in the form of thin film. The glass fiber forms are described in detail.

The proton-conducting membrane of the present invention is normally 10 to 300 µm thick, preferably 30 to 100 µm thick.

The membrane thinner than 10 µm may be insufficiently durable and tends to suffer defects, e.g., pinholes. The one thicker than 300 µm has excessively high resistance to conduction, and is also unsuitable for fuel cells as an electrolytic membrane.

The glass fibers for the proton-conducting membrane fall into 3 types in consideration of the limitation of membrane thickness; woven fabric, nonwoven fabric and glass fiber paper made by a paper-making process. Of these, woven and non-woven fabric can be selected, when the glass fibers are used as the continuous ones. The fabric is preferably of a type which can use continuous fibers in order to exhibit a sufficient strength in the form of thin film.

The woven fabrics may be square, diagonal, Turkish satin, gauze elastic, and leno weaves, among others, of which a square weave is particularly preferable for the present invention to prevent elongation of the membrane. The square weave, is preferably not excessively tight to reduce its effect of blocking proton conductance in the membrane, because the ion conductance passages may be blocked in an excessively tight membrane. A fairly coarse weave, e.g., that of yarns thinned out on every other yarn, is preferable. Such a weave is referred to as thirled, square weave in the present invention.

The square weave structure is defined by yarn count and density (pitch), among others. The following structure is preferable for the proton conducting membrane of the present invention.

The yarn is a bundle of 50 to 1000 twisted glass fibers, and its count is represented by Tex having a unit of mass (g) per 1000 m. Its count is preferably 3 to 50 Tex. The finer yarn is more easily cut in the production process, although showing better properties. The yarn thicker than 50 Tex is difficult to make the base on the thin film suitable for the proton conducting membrane.

Weave density, which is referred to as count density or pitch, means number of the yarns per 25 mm width. The weave of low density cannot exhibit the reinforcing effect sufficiently. Conversely, weave density is limited by fineness of the yarn. The weave preferably has a density of 40 to 200 yarns/25 mm width.

Thickness of the square weave is essentially determined by the above specifications, 20 to 100 µm based on the above specifications.

Density (mass per unit area), which is related to thickness, is normally 10 to 50 g/m², preferably 15 to 25 g/m² for the same reasons described above.

The long fibrous material (K) cannot directly form a uniform composite structure, even when mixed beforehand with the starting materials for the organic/inorganic hybrid structure (A) and acid-containing structure (B), unlike the short fibrous material (J). Therefore, it preferably has a specific shape (sheet) before it is incorporated.

The long fibrous material (K), to be incorporated to form a composite structure, is preferably loaded with a starting mixture of the organic/inorganic hybrid structure (A) and acid-containing structure (B). It may be loaded by pressing or the liquid, starting mixture on the sheet, or rolling. The loading method can be optionally selected from the known, simple ones.

The loading methods are described above for glass fibers. However, the similar methods are applicable to the other fibrous materials, e.g., those composed of fluorine resin, cyclopolyolefin resin or high-molecular-weight polyolefin resin.

6. Other Additives

The proton conducting membrane of the present invention can exhibit its intended performance so long as it satisfies the requirements of simultaneously containing (a) an organic/inorganic hybrid structure (A) covalently bonded to 2 or more silicon-oxygen crosslinks and having a carbon atom, and (b) an acid containing structure (B) having an acid group, covalently bonded to a silicon-oxygen crosslink and having an acidic group. However, it may be further incorporated with another additive within limits not harmful to its performance.

These additives include the following i) to iv):

i) hydrophilic, polymeric compound, to impart hydrophilicity to the membrane,
ii) finely powdered metallic oxide, such as silica, to impart water retentivity to the membrane,
iii) reinforcing agent composed of glass or the like of fibril or fibrous structure, to be used as the membrane base, the reinforcing agent is described earlier, and
iv) auxiliary acid, or salt, ester or amide structure to improve conductivity of the membrane.

The membrane may be also dispersed with a catalyst, e.g., platinum, although necessity therefore varies depending on electrode structure or the like.

Content of these additives is not limited so long as it is not harmful to performance of the membrane. However, content of the total additives is preferably 50% or less by weight based on the total membrane weight, although not sweepingly generalized, because content not harmful to the performance greatly varies additive by additive.

7. Method for Producing the Proton Conducting Membrane

The proton conducting membrane of the present invention can be produced by various methods, and the method is not limited. For examples, the major methods include the following four types (hereinafter referred to the first to fourth methods):

1) First Method

First step: Preparing a mixture containing an organic/inorganic hybrid, crosslinkable compound (C) and compound (D), the former having 2 or more crosslinkable silyl groups and carbon atoms each being bonded to the silyl group via the covalent bond and the latter having a crosslinkable silyl group and acid group.

Second step: Forming the above mixture into a film.

Third step: Hydrolyzing/condensing or only condensing the hydrolyzable silyl group contained in the mixture formed into the film to form a crosslinked structure.

2) Second Method

First step: Preparing a mixture containing an organic/inorganic hybrid, crosslinkable compound (C) and compound (E), the former having 2 or more crosslinkable silyl groups and carbon atoms each being bonded to the silyl group via the covalent bond and the latter having a crosslinkable silyl group and mercapto group.

Second step: Forming the above mixture into a film.

Third step: Hydrolyzing and condensing the hydrolyzable silyl group contained in the mixture formed into the film to form a crosslinked structure.

Fourth step: Oxidizing the mercapto group in the crosslinked structure obtained in the third step into sulfonic acid.

3) Third Method

First step: Preparing a mixture containing an organic/inorganic hybrid, crosslinkable compound (C) and compound (F), the former having 2 or more crosslinkable silyl groups and carbon atoms each being bonded to the silyl group via the covalent bond and the latter having a crosslinkable silyl group and polysulfide group.

Second step: Forming the above mixture into a film.

Third step: Hydrolyzing and condensing the hydrolyzable silyl group contained in the mixture formed into the film to form a crosslinked structure.

Fourth step: Oxidizing the polysulfide group in the crosslinked structure obtained in the third step into sulfonic acid.

4) Fourth Method

First step: Preparing a mixture containing an organic/inorganic hybrid, crosslinkable compound (C) and compound (H), the former having 2 or more crosslinkable silyl groups and carbon atoms each being bonded to the silyl group via the covalent bond and the latter having a crosslinkable silyl group and halogen group.

Second step: Forming the above mixture into a film.

Third step: Hydrolyzing and condensing the hydrolyzable silyl group contained in the mixture formed into the film to form a crosslinked structure.

Fourth step: Substituting the halogen group in the crosslinked structure obtained in the third step with sulfonic acid group.

7.1 First Method

This method comprises, as described above, the first step of preparing a mixture containing an organic/inorganic hybrid, crosslinkable compound (C) and compound (D), the former having 2 or more crosslinkable silyl groups and carbon atoms each being bonded to the silyl group via the covalent bond and the latter having a crosslinkable silyl group and acid group, second step of forming the above mixture into a film, and third step of hydrolyzing/condensing or only condensing the hydrolyzable silyl group contained in the mixture formed into the film to form a crosslinked structure.

It is described in more detail for the starting materials and treatment conditions, among others, for these steps orderly.

The first method of the present invention first prepares a mixture containing an organic/inorganic hybrid, crosslinkable compound (C) and acid containing compound (D).

The proton conducting membrane of the present invention should satisfy the requirements of simultaneously containing (a) an organic/inorganic hybrid structure (A) covalently bonded to 2 or more silicon-oxygen crosslinks and having a carbon atom, and (b) an acid containing structure (B) having an acid group, covalently bonded to a silicon-oxygen crosslink and having an acidic group. Therefore, the starting materials each corresponding to the organic/inorganic hybrid structure (A) or acid containing structure (B) are used to form the crosslinked structure.

A hydrolyzable silyl group is one of the crosslinking precursors for forming the crosslinked structure. The hydrolyzable silyl group as the crosslinking precursor forms the crosslink composed of the Si—O bond by hydrolysis and subsequent condensation. This process is known as the sol-gel process.

The hydrolyzable silyl groups include alkoxysilyl groups with alkoxy group (e.g., methoxy, ethoxy, propoxy or phenoxy) directly bonded to the silicon atom, halogenated silyl groups with a halogen (e.g., chlorine) bonded to the silicon atom, and carboxylated silyl groups (e.g., acetoxy). Moreover, silanol and silanolate groups, which are hydrolyzed beforehand, may be also used. In this case, hydrolysis is no longer necessary and the third step may only involve condensing.

It is important for the present invention to use an organic/inorganic hybrid, crosslinkable compound (C) having 2 or more crosslinkable silyl groups and carbon atoms each being bonded to the silyl group via the covalent bond, in order to form the organic/inorganic hybrid structure (A).

The crosslinkable compounds having 3 or more crosslinked sites include 1,3,5-tris(trichlorosilylethyl)-2,4,6-trimethylbenzene, tris(p-trichlorosilylpropylphenyl)amine and tris(3-trimethoxysilylpropyl)isocyanurate. They are commercialized by Gelest, Inc., and can be directly used as the crosslinkable compounds. Moreover, 1,2,4-trivinylcyclohexane and triallylamine (both commercialized by Aldrich) can be treated for hydrosilylation with trialkoxysilane, dialkoxyalkylsilane or monoalkoxydialkylsilane to produce the corresponding starting compounds. The starting compounds can be also produced by the reaction with, e.g., 3-triethoxysilylpropylisocyanate or the like for the compounds having hydroxyl or amino group in the molecular structure, and by the reaction with, e.g., 3-triethoxysilylpropylamine for those having a reactive group, e.g., isocyanate, in the molecular structure.

The crosslinkable compounds having 4 crosslinked sites can be easily produced by the hydrosilylation of tetraallylsilane (Gelest, Inc.) or tetravinyl silane (Aldrich) as the commercial products. In other words, it is sufficiently possible to synthesize various starting compounds having 3 or more crosslinked sites. Similarly, those having 2 or more crosslinkable silyl groups in the side chain of straight-chain or cyclic siloxane or the like can be synthesized or commercially available.

For the crosslinkable compounds having 2 crosslinked sites in the molecular chain, the precursors represented by, e.g., the general formula (7) is suitably used:

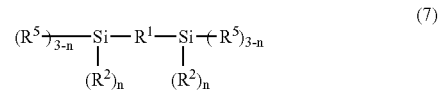

(7)

(wherein, $R^1$ is a carbon-containing group of 1 to 50 carbon atoms; $R^2$ is methyl, ethyl, propyl or phenyl group; $R^5$ is Cl, or $OCH_3$, $OC_2H_5$, $OC_6H_5$, OH or $OCOCH_3$ group; and "n" is 0, 1 or 2).

Some of the crosslinkable precursors for these structures are commercially available and directly used. They can be synthesized from the precursor having the corresponding unsaturated bond, when available, by hydrosilylation of the crosslinkable silyl compound.

Many compounds with a hydrocarbon as $R^1$ are commercially available or easily synthesized. When it has an aromatic ring, divinylbenzene, 1,4'-divinylbiphenyl or divinylnaphthalene, for example, can be easily converted into the corresponding crosslinkable compound by hydrosilylation. Bis(trimethoxysilylethyl)benzene is commercialized by Gelest, Inc.

Of these compounds, the crosslinkable compound (C) represented by the general formula (8) ca be produced by hydrosilylation of the corresponding diene compound:

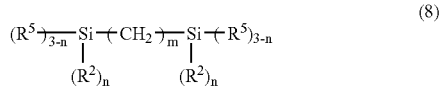

(wherein, $R^2$ is methyl, ethyl, propyl or phenyl group; $R^5$ is Cl, or $OCH_3$, $OC_2H_5$, $OC_6H_5$, OH or $OCOCH_3$ group; "m" is an integer of 1 to 30; and "n" is 0, 1 or 2).

Some of these crosslinkable compounds, e.g., bis(triethoxysilyl)ethane, bis(trimethoxysilyl)hexane, bis(triethoxysilyl)octane and bis(triethoxysilyl)nonane, are commercialized by Gelest, Inc. Of these, bis(triethoxysilyl)octane having 8 methylene chains is readily available, and suitably used. Bis(trialkoxysilyl)octane, bis(dialkoxyalkylsilyl)octane and bis(alkoxydialkylsilyl)octane are also suitably used, because 1,7-decadiene as the starting compound is easily available. Other compounds of different chain length can be easily synthesized into the corresponding crosslinkable compounds by hydrosilylation of those compounds with unsaturated bonds at both terminals, e.g., 1,3-butadiene, 1,9-decadiene, 1,13-tetradecadiene, 1,15-hexadecadiene and 1,21-docosadiene. Moreover, compounds of longer chain can be also synthesized.

For hydrosilylation of unsaturated bonds, functional group number of the crosslinking group can be freely selected when triethoxysilane, diethoxymethylsilane or ethoxydimethylsilane is used as the hydrosilyl compound, and hence crosslinking density or the like can be finely designed.

A siloxane-based compound can be also used, in addition to the hydrocarbon-based compound described above, as the main skeleton of the organic/inorganic hybrid, crosslinkable compound (C) as the starting compound for the organic/inorganic hybrid structure (A).

A siloxane-based compound can be suitably used for a proton-conducting membrane, because of its stability to acid and heat and resistance to oxidation.

Examples of these siloxane compounds are those represented by the general formula (10):

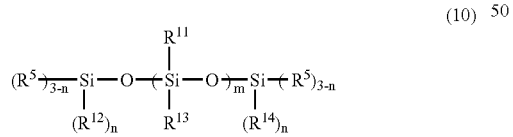

(wherein, $R^{11}$, $R^{12}$, $R^{13}$ and $R^{14}$ are each methyl, ethyl, propyl or phenyl group, which may be the same or different; $R^5$ is Cl, or $OCH_3$, $OC_2H_5$, $OC_6H_5$, OH or $OCOCH_3$ group; "m" is an integer of 1 to 30; and "n" is 0, 1 or 2).

These siloxane-based compounds useful for the siloxane-based organic/inorganic hybrid, crosslinkable compound (C) for the present invention include, but not limited to, the following ones.

Polydimethylsiloxane with silanol at both terminals, polydiphenylsiloxane with silanol at both terminals, polydimethylsiloxanepolydiphenylsiloxane copolymer with silanol at both terminals, polydimethylsiloxane with chlorine at both terminals, polydimethylsiloxane with diacetoxymethyl at the terminal, polydimethylsiloxane with methoxy at the terminal, polydimethylsiloxane with dimethoxymethylsilyl at the terminal, polydimethylsiloxane with trimethoxysilyl at the terminal and methoxymethylsiloxane-dimethylsiloxane copolymer, which are commercialized by, e.g., Gelest, Inc.

Moreover, a vinyl siloxane compound with trimethoxysilane, dimethoxymetylsilane or methoxydimethylsilane added to the vinyl group by hydrosilylation is also suitably used. These vinyl compounds include polydimethylsiloxane with vinyl at the terminal, diphenylsiloxanedimethylsiloxane copolymer with vinyl at the terminal, polyphenylmethylsiloxane with vinyl at the terminal, polyvinylmethylsiloxane, vinyl methylsiloxane-dimethylsiloxane copolymer, vinyl methylsiloxane-diphenylsiloxane copolymer, vinyl methylsiloxanetrifluoropropylmethylsiloxane copolymer and polyvinylmethoxysiloxane.

Of these, a polydimethylsiloxane-based compound is particularly suitably used, because of its availability. The polydimethylsiloxane-based organic/inorganic hybrid, crosslinkable compound (C) is represented by the general formula (11):

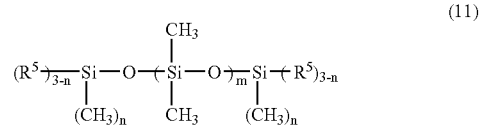

(wherein, $R^5$ is Cl, or $OCH_3$, $OC_2H_5$, $OC_6H_5$, OH or $OCOCH_3$ group; "m" is an integer of 1 to 30; and "n" is 0, 1 or 2).

In the first method of the present invention, it is important to use a compound (D) having a crosslinkable silyl group and acid group to form the crosslinked structure (B) containing an acid group. The compound (D) is not limited, so long as it contains a silyl group which can be bonded and acid group. For example, those compounds represented by the general formula (12) can be used:

(wherein, $R^3$ is a molecular chain group having at least one acid group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

Various acid groups are useful as the ones which $R^3$ has. For example, they include sulfonic, phosphonic, carboxylic, sulfuric, phosphoric and boric acid, of which sulfonic acid is particularly preferable, because it has a low pKa value, can secure proton in the membrane at a sufficiently high concentration and is thermally stable.

When the structure (B) containing an acid group has a structure represented by the general formula (6), the acid containing compound (D) as the starting material for the corresponding precursor has a structure represented by the general formula (13):

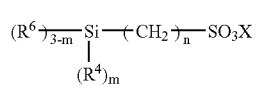

(wherein, $R^4$ is methyl, ethyl, propyl or phenyl group; $R^6$ is Cl, or $OCH_3$, $OC_2H_5$, $OC_6H_5$, OH or $OCOCH_3$ group; X is hydrogen, an alkali metal, alkyl group or ammonium group; "m" is 0, 1 or 2; and "n" is an integer of 1 to 20).

Of the starting compounds for these structures, trihydroxysilylpropylsulfonic acid for the structure having "n" of 3, commercialized by Gelest, Inc., is particularly preferable because of its availability.

Moreover, compounds disclosed by Japanese Patent Laid-open Publication No.54-138522 (U.S. Pat. No. 4,152,165) are also suitably used as the acid-containing compound (D).

The acid-containing structure (B) can be also produced by oxidation of a film formed using a compound having an alkoxysilyl and halogenated alkyl group after the halogen is substituted by dithiocarbonic acid or the like; directly reacting sulfurous acid on an unsaturated bond in a film formed using a compound having an alkoxysilyl group and the unsaturated bond; and oxidation of an unsaturated bond after a sulfur compound, e.g., thiosulfuric acid, is added to the bond.

In the first method of the present invention, the mixing ratio of the organic/inorganic hybrid, crosslinkable compound (C) to the acid-containing compound (D) is not limited. In general, however, it is preferably 9:1 to 1:9 by weight. The membrane is fragile and difficult to handle when the organic/inorganic hybrid, crosslinkable compound (C) is incorporated at below 10%. On the other hand, it cannot secure a sufficient proton conductivity at its content above 90%. The above ratio almost corresponds to the final (A)/(B) ratio in the membrane.

In the first method of the present invention, a crosslinking agent (G) may be incorporated, as required, in addition to the organic/inorganic hybrid, crosslinkable compound (C) and compound (D) containing an acid group. The crosslinking agent (G) works to further strengthen the chemical bonds in the crosslinked structure of the organic/inorganic hybrid, crosslinkable compound (C) and compound (D) containing an acid group and also further enhance extent of crosslinking thereby contributing to improved membrane properties, e.g., toughness and gas barrier characteristics.

A crosslinkable, metallic compound which gives another metal oxide (e.g., that of titanium, zirconium or aluminum oxide) can be suitably used as the crosslinking agent (G). These metallic compounds include mono-, di-, tri- or tetra-alkoxide of titanium, zirconium or aluminum. A crosslinkable metal containing a substituent, e.g., complex with acetylacetone, may be also incorporated to adjust reactivity. The crosslinked structure may be also incorporated with phosphoric, phosphorous or boric acid in combination with the above. Content of the hydrolyzable metallic compound other than silicon compound is not limited, but preferably 50% by mol or less on the hydrolyzable silyl group for cost and easiness of controlling the reaction.

More specifically, the compounds useful for the crosslinking agent (G) include alkoxysilicates, e.g., tetraethoxysilane, tetramethoxysilane, tetraisopropoxysilane, tetra-n-butoxysilane, tetra-t-butoxysilane, and monoalkyl and dialkyl derivatives thereof, alkoxy titanates, e.g., phenyltriethoxy titanate, halogenated titanates, tetraethoxy titanium, tetra-isopropoxytitanium, tetra-n-butoxytitanium, tetra-t-butoxytitanium, and monoalkyl and dialkyl derivatives thereof, and also oligomers thereof, hydrolyzable zirconium compounds, e.g., zirconium tetra-n-butoxide, zirconium tetra-t-butoxide, zirconium tetra-n-propoxide, zirconium tetra-i-propoxide, zirconium tetraethoxide, zirconium tetra(2-methyl-2-butoxide) and zirconium tetra(2-ethylhexyoxide); hydrolyzable aluminum compounds, e.g., aluminum-tri-s-butoxide, aluminum-tri-n-butoxide, aluminum-tri-t-butoxide, aluminum-tri-i-propoxide and aluminum-triphenoxide; and phosphoric, phosphorous and boric acid, and esters thereof. The hydrolyzable metallic compound may be formed into a complex with a β-diketone (e.g., acetylacetone or acetoacetic acid ester), ethylene glycol, ethylene glycol (mono- or di-)alkyl ester, or ethanol amine, to control the reactivity.

A hydrolyzable alkoxysilane polymer represented by the general formula (21) may be also used as the crosslinking agent (G):

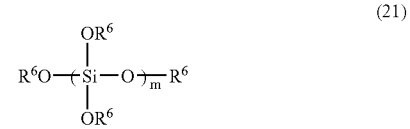

(wherein, $R^6$ is $CH_3$ or $C_2H_5$ group; and "m" is an integer of 1 to 300).

The hydrolyzable alkoxysilane polymer can be suitably used, because it has adequate crosslinking performance and its reactivity itself is easily controlled. When the organic/inorganic hybrid structure (A) has one silanol group at the terminal, in particular, use of the crosslinking agent (G) imparts adequate softness and strength simultaneously to the membrane.

The first method of the present invention may use an adequate solvent to prepare a mixture of an organic/inorganic hybrid, crosslinkable compound (C), compound (D) containing an acid group and crosslinking agent (G) in the first step. The solvents useful for the present invention generally include, but not limited to, alcohols, e.g., methanol, ethanol, isopropanol, n-butanol and t-butanol; ethers, e.g., tetrahydrofuran and dioxane; glycol alkyl ethers, e.g., ethylene glycol monomethyl ether, ethylene glycol monoethyl ether and ethylene glycol monobutyl ether; and water. Any solvent may be used so long as it is useful for dissolution or mixing an organic compound, metallic alkoxide or the like.

Ratio of the solvent is not limited, but the content is preferably adjusted to give a solids concentration of 80 to 10% by weight.

The first step for mixing the starting compounds for the precursors may use another optional component, e.g., reinforcing agent, softening agent, surfactant, dispersant, reaction promoter, stabilizer, colorant, antioxidant, or inorganic or organic filler, within limits not harmful to the object of the present invention.

The mixing may be achieved by a known method, e.g., agitation or vibration. The mixing method is not limited, so long as it can sufficiently mix the materials. Heating, pressurizing, defoaming, degassing or the like may be used, as required.

In the first method, the second step follows the first step to make a thin film of the precursor mixture solution, obtained in the first step, by a known method, e.g., casting or coating.

The film-making method is not limited, so long as it can give a uniform film. Film thickness can be optionally varied in a range from 10 µm to 1 mm. It is adequately selected in consideration of proton conductivity, fuel permeability and mechanical strength of the film, among others. It is not limited, but preferably, in general, in a range from 30 to 300 µm on a dry basis.

The film may be incorporated with a support or reinforcing agent of fibers, mat or fibrils during the film-making step. These are preferably of glass, silicon resin, fluorine resin or polymeric material in consideration of their resistance to heat and acid.

In the first method, then, the third step follows the second step to hydrolyze and condense the crosslinking group (more specifically, the hydrolysable silyl group) in the film prepared in the second step (hydrolysis is saved when the crosslinking group is silanol or silanolate) to form a crosslinked structure composed of the silicon-oxygen bond. The crosslinking is achieved by the so-called sol-gel reaction.

The objective membrane is produced under heating at an optional temperature in a range from room temperature to around 300° C. in the crosslinking step. It is heated by a known method, e.g., heating in an oven, or in an autoclave under pressure.

The precursor mixture solution may be incorporated with water or heated in a hydrothermal condition beforehand to perform the hydrolysis/condensation more efficiently in the third step.

An acid, e.g., hydrochloric, sulfuric or phosphoric acid, may be incorporated as a catalyst beforehand in the reaction system, to accelerate formation of the crosslinked structure. Formation of the crosslinked structure can be accelerated also in the presence of a base. Therefore, a basic catalyst, e.g., ammonia or sodium hydroxide, may be also used.

It is preferable for the first method to crosslink the hydrolysable silyl group at 100 to 300° C. in the third step, or include an aging step effected at 100 to 300° C. subsequently to the third step.

When the proton-conducting membrane of the present invention is to be used at a high temperature of 100° C. or higher, it is preferably heated at service temperature or higher. This can be achieved directly in the crosslinking step effected at 100 to 300° C., or by heating at 100 to 300° C. subsequent to the crosslinking step where the membrane is hardened by the sol-gel process at, e.g., 5 to 40° C. for 2 hours or more. It can be heated by an ordinary heat source, far-infrared ray, electromagnetic wave induction, microwaves, or a combination thereof.

The membrane undergoing these steps may be washed with water, as required. The washing medium is preferably distilled or ion-exchanged water free of metallic ion. It may be also treated with sulfuric acid or hydrogen peroxide, to remove impurities and unnecessary metallic ions, and thereby to further increase proton content in the membrane.

The treated membrane may be further irradiated with ultraviolet or electron beams to further increase extent of crosslinking.

7.2 Second Method

This method comprises, as described above, the first step of preparing a mixture containing an organic/inorganic hybrid, crosslinkable compound (C) and compound (E), the former having 2 or more crosslinkable silyl groups and carbon atoms each being bonded to the silyl group via the covalent bond and the latter having a crosslinkable silyl group and mercapto group, second step of forming the above mixture into a film, the third step of hydrolyzing/condensing the hydrolyzable silyl group contained in the mixture formed into the film to form a crosslinked structure, and the fourth step of oxidizing the mercapto group in the crosslinked structure obtained in the third step into sulfonic acid.

It is described in more detail for the starting materials and treatment conditions, among others, for these steps orderly.

The second method of the present invention first prepares a mixture containing an organic/inorganic hybrid, crosslinkable compound (C) and mercapto-containing compound (E) containing a crosslinkable silyl group and-mercapto group.

The proton conducting membrane of the present invention should satisfy, as mentioned earlier, the requirements of simultaneously containing an organic/inorganic hybrid structure (A) and an acid-containing structure (B). Therefore, the starting materials each corresponding to the organic/inorganic hybrid structure (A) or acid-containing structure (B) are used to form the crosslinked structure.

Accordingly, an organic/inorganic hybrid, crosslinkable compound (C) as the starting material for the organic/inorganic hybrid structure (A) is the same as that for the first method.

For the starting material for the acid-containing structure (B), on the other hand, a compound (E) containing a mercapto group is used in place of a compound (D) containing an acid group for the first method. A mercapto group can be converted into sulfonic acid as a functional group, and the acid-containing structure (B) can be obtained by incorporation of the mercapto group followed by its oxidation.

The compound (E) containing a mercapto group is not limited so long as it has a mercapto group and crosslinkable silyl group. However, a compound represented by the general formula (14) is suitably used:

(wherein, $R^7$ is a molecular chain group having at least one mercapto group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

Of these compounds, the compound (E) containing a mercapto group is more preferably represented by the general formula (15) in consideration of stability of $R^7$ to heat, acid and oxidation:

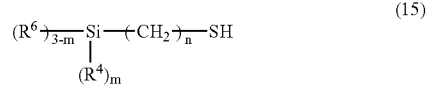

(wherein, $R^4$ is methyl, ethyl, propyl or phenyl group; $R^6$ is Cl, or $OCH_3$, $OC_2H_5$, $OC_6H_5$, OH or $OCOCH_3$ group; "m" is 0, 1 or 2; and "n" is an integer of 1 to 20).

The compounds represented by the above formula are commercially available. The known ones include 3-mercaptopropyltrimethoxysilane, 3-mercaptopropyltriethoxysilane, 3-mercaptopropylmethyldimethoxysilane, mercaptomethyltrimethoxysilane and mercaptomethyldiethoxysilane.

The compounds useful for the compound (E) containing a mercapto group, other than those commercially available, can be easily synthesized by, e.g., reaction of sodium hydrosulfide with a halide having an alkoxysilyl group and halogenated alkyl, e.g., 3-chloropropyltrimethoxysilane, or hydrolysis of an alkyl group having an alkoxysilyl group and unsaturated bond, e.g., allyltriethoxysilane, after thioacetic acid or the like is added.

They may be a polymer or oligomer, which can be synthesized from the compound containing a mercapto group as the starting compound.

Examples of the polymers or oligomers have a structure represented by the general formula (16):

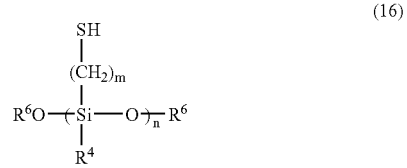

(16)

(wherein, $R^6$ is H, or $CH_3$, $C_2H_5$, $C_3H_7$ or $C_6H_5$ group; $R^4$ is $CH_3$, $C_2H_5$, $C_3H_7$, $C_6H_5$, OH, $OCH_3$, $OC_2H_5$, $OC_6H_5$ group, or O—Si bond; "m" is an integer of 1 to 20; and "n" is an integer of 3 to 500).

The compound represented by the general formula (16) with $R^4$ of a hydrocarbon group is preferable, because of its flexible bond to increase flexibility of the final membrane. The compound represented by the general formula (16) with $R^4$ of OH or an alkoxy group is also preferable, because it can be involved in the crosslinking reaction to make the bond faster, thereby contributing to improved properties of the membrane, e.g., stabilized conducting characteristics and increased toughness. It is more preferable that the compound has a hydrocarbon group and OH or alkoxy group simultaneously as $R^4$ in the same molecule, because flexibility and toughness of the membrane can be controlled in this case.

Moreover, "n" in the general formula (16) is preferably 3 or more, because the oxidation-produced sulfonic acid group has a chain structure, which accelerates the proton conduction and, at the same time, provides a strong polar field to allow water to be collected more efficiently. On the other hand, "n" above 500 is not preferable, because the molecule is difficult to synthesize, has reduced compatibility with the organic/inorganic hybrid, crosslinkable compound (C), and is difficult to form a uniform membrane. In particular, when $R^4$ is a hydrocarbon group, inclusion of the molecule in the membrane is prevented because of reduced number of the functional groups, and substantially "n" is preferably 300 or less.

The compound represented by the general formula (16) with $R^4$ of $OCH_3$ group, "m" of 3 and "n" of 10 is commercialized by Shin-etsu Silicones (X-41-1805).

This oligomer can be also easily synthesized, e.g., by the method disclosed by Journal of Polymer Science, Part A, Polymer Chemistry, Vol.37, P.1017 (1999). This method can synthesize the oligomer and polymer having a molecular weight of up to several tens of thousands using the mercapto compound represented by the general formula (14) or (15) as the starting material by selecting an adequate reaction catalyst, and controlling quantity of water for hydrolysis and reaction time, among others. These oligomers and polymers can be readily available, and can be suitably used for the present invention.

For example, the compound represented by the general formula (16) with $R^4$ of $CH_3$ group, "m" of 3 and "n" of 3 to 300 can be synthesized by the method similar to that described in the above literature using 3-mercaptopropylmethyldimethoxysilane as a commercial product. These can give the membrane of high flexibility, and suitably used for the present invention.

Moreover, the oligomer or polymer represented by the general formula (17) can be also suitably used:

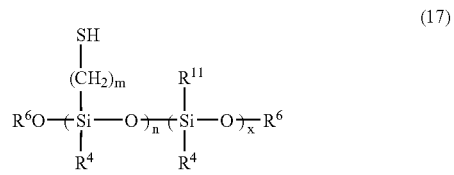

(17)

(wherein, $R^6$ is H, or $CH_3$, $C_2H_5$, $C_3H_7$ or $C_6H_5$ group; $R^4$ is $CH_3$, $C_2H_5$, $C_3H_7$, $C_6H_5$, OH, $OCH_3$, $OC_2H_5$ or $OC_6H_5$ group; $R^{11}$ is a substitute of 6 carbon atoms or less; "m" is an integer of 1 to 20; "n" is an integer of 3 to 500; and "n+x" is an integer of 500 or less, where the unit containing mercapto group and that containing $R^{11}$ may be present in a block or random form).

The compound represented by the general formula (17) with $R^4$ of $OCH_3$ group, "m" of 3 and "n+x" of around 10 is commercialized by Shin-etsu Silicones (X-41-1810). These compounds can be easily synthesized by referring to the above-described literature using 2 or more alkoxysilane compounds, and can be suitably used for the present invention.

The second method of the present invention makes a thin film in the second step using the mixture prepared in the first step, and forms a crosslinked structure in the film in the third step. These second and third steps are similar to those for the first method.

In addition, a crosslinking agent (G), another additive, solvent or the like may be used, as required, as is the case with the first method.

In the second method of the present invention, the third step is followed by the fourth step, where the mercapto group in the crosslinked structure obtained in the third step is oxidized into sulfonic acid. In this step, the film-like object containing the compound (E) has the mercapto group oxidized into sulfonic acid group to become a proton-conducting membrane.

A common oxidizing agent is used for oxidizing the mercapto group. These agents include nitric acid, hydrogen peroxide, oxygen, organic peroxide (percarboxylic acid), bromine water, hypochlorite, hypobromite, potassium permanganate and chromate.

The oxidation of mercapto group in the presence of the above oxidizing agent is a known process, described in Jikken Kagaku Koza (Maruzen, third edition, P.1775) and literature cited therein. Of these agents, hydrogen peroxide and organic peroxide (e.g., peracetic and perbenzoic acid) are more suitably used, because they are handled relatively easily and give a high oxidation yield.

The oxidation-treated membrane may be treated with a strong acid, e.g., hydrochloric or sulfuric acid, to make the sulfonic acid group therein protonic. The treatment conditions, e.g., acid concentration, and immersing time and temperature, are adequately determined in consideration of concentration of the compound containing sulfonic acid group in the membrane, membrane porosity and its affinity for the acid. The representative treatment conditions are 1N sulfuric acid in which the membrane is immersed at 50° C. for 1 hour.

7.3 Third Method

This method comprises, as described above, the first step of preparing a mixture containing an organic/inorganic hybrid, crosslinkable compound (C) and compound (F), the former having 2 or more crosslinkable silyl groups and carbon atoms each being bonded to the silyl group via the covalent bond and the latter having a crosslinkable silyl group and polysulfide group, second step of forming the above mixture into a film, the third step of hydrolyzing/condensing the hydrolyzable silyl group contained in the mixture formed into the film to form a crosslinked structure, and the fourth step of oxidizing the polysulfide group in the crosslinked structure obtained in the third step into sulfonic acid.

It is described in more detail for the starting materials and treatment conditions, among others, for these steps orderly.

The third method of the present invention first prepares a mixture containing an organic/inorganic hybrid, crosslinkable compound (C) and compound (F) containing a crosslinkable silyl group and polysulfide group.

The proton conducting membrane of the present invention should satisfy, as mentioned earlier, the requirements of simultaneously containing an organic/inorganic hybrid structure (A) and acid-containing structure (B). Therefore, the starting materials each corresponding to the organic/inorganic hybrid structure (A) or acid-containing structure (B) are used to form the crosslinked structure.

Accordingly, an organic/inorganic hybrid, crosslinkable compound (C) as the starting material for the organic/inorganic hybrid structure (A) is the same as that for the first and second method.

For the starting material for the acid-containing structure (B), on the other hand, a compound (F) containing a polysulfide group is used in place of a compound (D) containing an acid group for the first method or compound (E) containing a mercapto group for the second method.

A polysulfide group can be converted into sulfonic acid as a functional group by oxidation. The acid-containing structure (B) can be produced by oxidation of the polysulfide group introduced.

The polysulfide group means a structure in which sulfur atoms are bonded to each other to form a chain, from a disulfide group (—S—S—) having 2 sulfur atoms to octasulfide group having 8 sulfur atoms.

Each of these groups is useful for the present invention. However, a disulfide (—S—S—) and tetrasulfide (—S—S—S—S—) group are more preferable for their general availability.

The compound (F) containing a polysulfide group is not limited so long as it has a polysulfide group and crosslinkable silyl group. However, a compound represented by the general formula (18) is suitably used:

(18)

(wherein, $R^8$ is a molecular chain group having at least one polysulfide group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

Of these compounds, the compound (F) containing a polysulfide group is more preferably represented by the general formula (19), which has a structure similar to that of the organic/inorganic hybrid, crosslinkable compound (C), in consideration of reactivity with the compound (C):

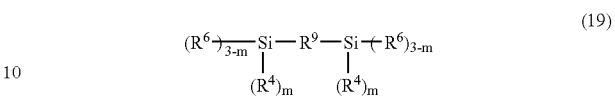

(19)

(wherein, $R^9$ is a molecular chain group having at least one polysulfide group; $R^4$ is methyl, ethyl, propyl or phenyl group; $R^6$ is Cl, or $OCH_3$, $OC_2H_5$, $OC_6H_5$, OH or $OCOCH_3$ group; and "m" is 0, 1 or 2).

Of these compound, the compound (F) containing a polysulfide group is more preferably represented by the general formula (20) in consideration of stability of $R^8$ to heat, acid and oxidation:

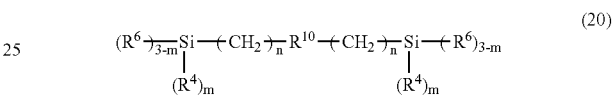

(20)

(wherein, $R^{10}$ is a polysulfide group; $R^4$ is methyl, ethyl, propyl or phenyl group; $R^6$ is Cl, or $OCH_3$, $OC_2H_5$, $OC_6H_5$, OH or $OCOCH_3$ group; "m" is 0, 1 or 2; and "n" is an integer of 1 to 6).

The compounds represented by the above formula are commercially available. The known ones include bis[3-(triethoxysilyl)propyl]tetrasulfide (Gelest, Inc. SIB 1825.0), and bis[3-(triethoxysilyl)propyl]disulfide (Shin-etsu Silicones KBE886B).

The compounds useful for the compound (F), other than those commercially available, can be easily synthesized by, e.g., dimerization of a thiol or ionic or radical addition of sulfur ($S_8$), and hence synthesized from a precursor which simultaneously has an inorganic, crosslinkable group and a group reactive with the sulfur compound described above.

The third method of the present invention makes a thin film in the second step using the mixture prepared in the first step, and forms a crosslinked structure in the film in the third step. These second and third steps are similar to those for the first and second methods.

In addition, a crosslinking agent (G), another additive, solvent or the like may be used, as required, as is the case with the first and second methods.

In the third method of the present invention, the third step is followed by the fourth step, where the polysulfide group in the crosslinked structure obtained in the third step is oxidized into sulfonic acid. In this step, the film-like object containing the compound (F) has the polysulfide group oxidized into sulfonic acid group to become a proton-conducting membrane.

The fourth step for oxidizing a polysulfide group in the third method can be similar to that of the fourth step for oxidizing a mercapto group in the second method.

Oxidation of a mercapto group differs from that of a polysulfide group in that the former gives one sulfonic acid group per one mercapto group whereas the latter gives 2 sulfonic acid groups per one polysulfide group, when a polysulfide-containing compound has a structure represented by the general formula (19) or (20).

Therefore, when a polysulfide-containing compound (F) having a structure represented by the general formula (19) or (20) is used, a proton-conducting membrane can be obtained at a mixing ratio of an organic/inorganic hybrid, crosslinkable compound (C) to the polysulfide-containing compound (F) from 95:5. The membrane has a sufficient strength when the ratio is kept at 10:90 or higher. The mixing ratio is preferably in the above range, accordingly.

7.4 Fourth Method

This method comprises, as described above, the first step of preparing a mixture containing an organic/inorganic hybrid, crosslinkable compound (C) and compound (H), the former having 2 or more crosslinkable silyl groups and carbon atoms each being bonded to the silyl group via the covalent bond and the latter having a crosslinkable silyl group and halogen group, the second step of forming the above mixture into a film, the third step of hydrolyzing/condensing the hydrolyzable silyl group contained in the mixture formed into the film to form a crosslinked structure, and the fourth step of substituting the halogen group in the crosslinked structure obtained in the third step with sulfonic acid group.

It is described in more detail for the starting materials and treatment conditions, among others, for these steps orderly.

The fourth method of the present invention first prepares a mixture containing an organic/inorganic hybrid, crosslinkable compound (C) and compound (H) containing a crosslinkable silyl group and halogen group.

The proton conducting membrane of the present invention should satisfy, as mentioned earlier, the requirements of simultaneously containing an organic/inorganic hybrid structure (A) and acid-containing structure (B). Therefore, the starting materials each corresponding to the organic/inorganic hybrid structure (A) or acid-containing structure (B) are used to form the crosslinked structure.

Accordingly, an organic/inorganic hybrid, crosslinkable compound (C) as the starting material for the organic/inorganic hybrid structure (A) is the same as that for the first to the third methods.

For the starting material for the acid-containing structure (B), on the other hand, a compound (H) containing a halogen group is used in place of a compound (D) containing an acid group for the first method, compound (E) containing a mercapto group for the second method, or compound (F) containing a polysulfide group for the third method.

The halogen group means chlorine, bromine, iodine or the like. In addition to a halogen group, a leaving group may be also used so long as it is reactive with sulfurous acid for substitution. These groups include tosylate and methanesulfonylate. However, the halogen group is more preferable than the leaving group, because it is generally more easily available.

A halogen group can be converted into sulfonic acid as a functional group by substitution with sulfurous acid. The reaction is known, and disclosed by, e.g., Organic Syntheses Collective Volume 2 (1943), P.558 and 564. The substitution reaction can be carried out easily and in a high yield by heating, e.g., sodium sulfite and a compound containing a halogen group in a mixed solvent of alcohol and water. The reaction product is generally in the form of salt, and may be post-treated with sulfuric acid or the like to be protonic.

The compound (H) containing a halogen group is not limited so long as it has a halogen group and crosslinkable silyl group. However, a compound represented by the general formula (22) is suitably used:

(wherein, $R^{12}$ is a molecular chain group having at least one halogen group; $R^4$ is methyl, ethyl, propyl or phenyl group; $R^6$, is Cl, or $OCH_3$, $OC_2H_5$, $OC_6H_5$, OH or $OCOCH_3$ group; and "m" is 0, 1 or 2).

Of these compounds, the compound (H) containing a halogen group is more preferably represented by the general formula (23) in consideration of stability of $R^{12}$ to heat, acid and oxidation:

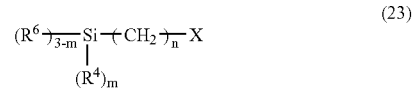

(wherein, $R^4$ is methyl, ethyl, propyl or phenyl group; $R^6$ is Cl, or $OCH_3$, $OC_2H_5$, $OC_6H_5$, OH or $OCOCH_3$ group; X is Cl, Br or I; "n" is an integer of 1 to 20; and "m" is 0, 1 or 2).

The compounds represented by the above formula are commercially available. The known ones include chloromethyldimethylchlorosilane, chloromethyldimethylethoxysilane, chloromethyldimethylisopropoxysilane, chloromethylmethyldiethoxysilane, chloromethymethyldiisopropoxysilane, chloromethyltrichlorosilane, chloromethyltriethoxysilane, chloromethyltrimethoxysilane, 2-chloroethylmethyldichlorosilane, 2-chloroethylmethyldimethoxysilane, 2-chloroethyltrichlorosilane, 2-chloroethyltriethoxysilane, 2-chloroethyltrimethoxysilane, 3-chloropropyldimethylchlorosilane, 3-chloropropyldimethylmethoxysilane, 3-chloropropylmethyldichlorosilane, 3-chloropropylmethyldimethoxysilane, 3-chloropropylphenyldichlorosilane, 3-chloropropyltilichlorosilane, 3-chloropropyltriethoxysilane, 3-chloropropyltrimethoxysilane, 4-chlorobutyldimethylchlorosilane, bromomethyldimethylchlorosilane, 2-bromoethyltrichlorosilane, 3-bromopropyltrichlorosilane, 3-bromopropyltriethoxysilane, 3-bromopropyltrimethoxysilane, 11-bromoundecyldimethylchlorosilane, 11-bromoundecyltrichlorosilane, 11-bromoundecyltrimethoxysilane and 3-iodopropyltrimethoxysilane. These compounds are readily available, although the compounds useful for the present invention are not limited to the above.

These compounds can be easily synthesized by reacting a compound having a halogen group at one terminal and unsaturated bond at the other terminal, represented by the general formula (24), with trialkoxysilane, dialkoxyalkylsilane, monoalkoxydialkylsilane or the like for hydrosilylation:

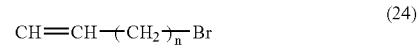

(wherein, "n" is an integer of 1 to 18).

For the hydrosilylation, bromine or iodine as the halogen group is more preferable than chlorine.

These compounds may be used as the oligomers or polymers, synthesized by the method disclosed by, e.g., Journal of Polymer Science, Part A, Polymer Chemistry, Vol.37, P.1017 (1999)), cited earlier.

The fourth method of the present invention makes a thin film in the second step using the mixture prepared in the first step, and forms a crosslinked structure in the film in the third step. These second and third steps are similar to those for the first to third methods.

In addition, a crosslinking agent (G), another additive, solvent or the like may be used, as required, as is the case with the first to third methods.

In the fourth method of the present invention, the third step is followed by the fourth step, where the halogen group in the crosslinked structure obtained in the third step is converted into sulfonic acid or its salt by substitution. In this step, the film-like object containing the compound (H) has a halogen group converted into sulfonic acid or its salt to become a proton-conducting membrane.

In this substitution process, the film-like object containing the halogen-containing compound (H) is reacted with a sulfite compound, e.g., sulfurous acid (aqueous solution), sodium sulfite, potassium sulfite, sodium hydrogen sulfite or potassium hydrogen sulfite, for which the method disclosed by Organic Syntheses Collective Volume 2 (1943), P.558 and 564 may be used. More specifically, a simple method involves heating the crosslinked membrane produced in an alcoholic aqueous solution containing sulfite ion.

The halogen group can be converted into sulfonic acid or its salt in the above step. When the salt is produced, the membrane is immersed in sulfuric acid or the like, to become a proton-conducting membrane.

When a halogen-containing compound (H) having a structure represented by the general formula (22) or (23) is used, a proton-conducting membrane can be obtained at a mixing ratio of an organic/inorganic hybrid, crosslinkable compound (C) to the halogen-containing compound (H)Y from 1:9. The membrane has a sufficient strength when the ratio is kept at 9:1 or lower. The mixing ratio is preferably in the above range, accordingly.

7.5 Method for Compositing a Fibrous Material (I)

As described earlier, a composite membrane containing a fibrous material (I) is one of the preferred embodiments of the proton-conducting membrane of the present invention. One of the first to fourth methods is basically applicable to production of such a composite membrane.

More specifically, each of the above methods further comprises an additional step for compositing the fibrous material. Some of the examples of this step are described below, which by no means limit the present invention. This step varies depending on, e.g., type and quantity of the fibrous material, as described below.

When the fibrous material (I) is a short fibrous material (J), e.g., short glass fibers (M) or whiskers (L), it may be added to the mixture in the first step of one of the first to fourth methods. It is preferably mixed with the mixture by a homogenizer or ball mill, which involves strong agitation to prevent agglomeration. The mixture is preferably used immediately after it is prepared to prevent separation, or else treated to have a certain viscosity to prevent the mixture from being easily separated.

When excessively incorporated, the short fibrous material (J) may not be dispersed sufficiently to possibly cause excessive permeation of the gas, and may decrease conductivity of the membrane. When incorporated insufficiently, it may not fully exhibit its effect. Therefore, it is incorporated at 1 to 75 parts by weight per 100 parts by weight of the organic/inorganic hybrid structure (A) and acid-containing structure (B) totaled.

On the other hand, a long fibrous material (K) as the fibrous material (I) cannot directly form a uniform composite structure, even when mixed beforehand with the starting materials for the organic/inorganic hybrid structure (A) and acid-containing structure (B), unlike the short fibrous material (J). Therefore, it preferably has a specific shape (sheet shape) before it is incorporated.

The long fibrous material (K), to be incorporated in the second step of one of the first to fourth methods, is preferably loaded with a starting mixture of the organic/inorganic hybrid structure (A) and acid-containing structure (B). It may be loaded by pressing or the liquid, starting mixture on the sheet, or rolling. The loading method can be optionally selected from the known, simple ones.

EXAMPLES AND COMPARATIVE EXAMPLES

The present invention is described by EXAMPLES, which by no means limit the present invention. All of the compounds, solvents and the like used in EXAMPLES and COMPARATIVE EXAMPLES were commercial ones. They were used directly, i.e., not treated for these examples. Properties of the proton conducting membrane prepared were evaluated by the analytical methods described below.

Analytical Methods (1) Evaluation of Membrane Properties

The proton conducting membrane was subjected to the bending functional test, and its properties were rated according to the following standards:

◯: The membrane can be bent, and is kept flexible.

x: The membrane cannot be bent.

(2) Evaluation of Proton Conductivity at Low Temperature

The proton conducting membrane of the present invention was coated with carbon paste (Conducting Graphite Paint: LADO RESEARCH INDUSTRIES, INC.) on both sides, to which platinum plates were fast adhered. It was analyzed for its impedance by an electrochemical impedance meter (Solartron 1260) in a frequency range from 0.1 Hz to 100 kHz, to determine its proton conductivity.

In the above analysis, the sample was supported in an electrically insulated closed container, and measured for its proton conductivity at varying temperature in a water vapor atmosphere (95 to 100% RH), where cell temperature was increased from room temperature to 160° C. by a temperature controller. Proton conductivity was measured at each temperature level, and the value measured at 60° C. is reported in this specification as the representative one. Moreover, the results obtained only at 140° C., or 60° C. and 160° C. are also reported for representative EXAMPLES. For the measurement at 100° C., the measurement tank was pressurized.

(3) Evaluation of Heat Resistance

The proton conducting membrane was heated at 140° C. for 5 hours in an autoclave in a saturated steam atmosphere. The treated membrane was evaluated for its heat resistance by the visual and bending functional tests, and its heat resistance was rated according to the following standards:

◯: No change is observed before and after the treatment.

x: Embrittlement, disintegration, discoloration or deformation of the treated membrane is observed.

Example 1

A solution of 0.9 g of 1,8-bis(triethoxysilyl)octane (Gelest, Inc.) dissolved in 1.5 g of isopropyl alcohol was prepared. Another solution of 1.5 g of isopropanol added to 1.8 g of a 33% aqueous solution of 3-(trihydroxysilyl) propanesulfonic acid was separately prepared. These solutions were mixed with each other, stirred for several minutes, and poured into a Petri dish of polystyrene (Yamamoto Seisakusho, inner diameter: 8.4 cm), where the mixture was left at room temperature (20° C.) for 15 hours, and heated at 80° C. for 10 hours in a saturated steam atmosphere and at 100° C. in an oven, to prepare the transparent, flexible membrane. It was washed in a flow of water at 60° C. for 2 hours, before it was analyzed. The evaluation results and the like of the membrane are given in Table 1.

Example 2

A membrane was prepared in the same manner as in EXAMPLE 1, except that 1.3 g of 1,8-bis(triethoxysilyl) octane (Gelest, Inc.) and 0.8 g of a 33% aqueous solution of 3-(trihydroxysilyl)propanesulfonic acid were used. The transparent, tough membrane was obtained. The evaluation results and the like of the membrane are given in Table 1.

Example 3

A membrane was prepared in the same manner as in EXAMPLE 1, except that 0.7 g of 1,8-bis(triethoxysilyl) octane (Gelest, Inc.) and 2.3 g of a 33% aqueous solution of 3-(trihydroxysilyl)propanesulfonic acid were used. The transparent, slightly fragile membrane was obtained. The evaluation results and the like of the membrane are given in Table 1.

Example 4

(Synthesis of Bifunctional Precursor)

A solution of 11.0 g of 1,7-octadiene (Wako Pure Chemical Industries) and 26.9 g of diethoxymethylsilane (Shin-etsu Silicones) dissolved in toluene was incorporated with 0.05 mmols of a solution of Karstedt catalyst (U.S. Pat. No. 3,775,452) prepared from a chloroplatinate (Wako Pure Chemical Industries) and divinyl tetramethyldisiloxane (Gelest, Inc.), and the resulting mixture was stirred at 30° C. in a nitrogen atmosphere for 24 hours. The reaction effluent was purified by distillation, to obtain 1,8-bis(diethoxymethylsilyl)octane. Its structure was confirmed by NMR analysis.

(Preparation of Mixture and its Film)

A membrane was prepared in the same manner as in EXAMPLE 1, except that 1.0 g of 1,8-bis(diethoxymethylsilyl)octane prepared above and 1.5 g of a 33% aqueous solution of 3-(trihydroxysilyl)propanesulfonic acid were used. The transparent, highly flexible membrane was obtained. The evaluation results and the like of the membrane are given in Table 1.

Example 5

A membrane was prepared in the same manner as in EXAMPLE 1, except that 0.9 g of 1,6-bis(trimethoxysilyl)hexane (Gelest, Inc.) and 1.7 g of a 33% aqueous solution of 3-(trihydroxysilyl)propanesulfonic acid were used. The transparent, slightly fragile membrane was obtained. The evaluation results are given in Table 1.

Example 6

(Synthesis of 1,14-bis(triethoxysilyl)tetradecane)

The synthesis method is described in detail by, e.g., H. W. Oviatt et al., Chem. Mater., 1993, 5, 943, and 1,14-bis (triethoxysilyl)tetradecane was synthesized following the above method. A mixture of 25 g of 1,13-tetradecadiene (Aldrich), 44.4 g of triethoxysilane (Shin-etsu Silicones) and 0.1 mL of a 3% xylene solution of platinum complex of bis((vinyl dimethyldisiloxane) (Shin-etsu Silicones) was prepared and stirred at room temperature in a nitrogen atmosphere for 3 days. The reaction effluent was purified by distillation, to obtain 1,14-bis(triethoxysilyl)tetradecane. Its structure was confirmed by NMR analysis.

(Preparation of Mixture and its Film)

A membrane was prepared in the same manner as in EXAMPLE 1, except that 1.1 g of 1,14-bis(triethoxysilyl) tetradecane prepared above and 1.3 g of a 33% aqueous solution of 3-(trihydroxysilyl)propanesulfonic acid were used. The transparent, highly flexible membrane was obtained. The evaluation results and the like of the membrane are given in Table 1.

Example 7

A membrane was prepared in the same manner as in EXAMPLE 1, except that 1.0 g of a compound having 10 dimethylsiloxane chains bonded to each other in series and trimethoxysilyl groups at both terminals (Shin-etsu Silicones, X-40-2090) and 1.5 g of a 33% aqueous solution of 3-(trihydroxysilyl)propanesulfonic acid were used. The whitely turbid, highly flexible membrane was obtained. The evaluation results and the like of the membrane are given in Table 1.

Example 8

A membrane was prepared in the same manner as in EXAMPLE 1, except that 0.3 g of 1N hydrochloric acid was added to 0.5 g of 3-mercaptopropyltrimethoxysilane (CHISSO CORPORATION, SILA-ACE S810) and 1.0 g of bis(diethoxymethylsilyl)octane, and the water washing step was saved.

The membrane was immersed in 7.0 mL of glacial acetic acid, to which 5.6 mL of a 30% aqueous solution of hydrogen peroxide was added little by little at 70° C. Then, the system was heated to 70° C., at which it was held for 20 minutes. The membrane was withdrawn from the system, after it was cooled, immersed in 1N sulfuric acid over a night, and then washed in a flow of water at 60° C. for 2 hours. The evaluation results and the like of the membrane are given in Table 1.

Example 9

A membrane was prepared in the same manner as in EXAMPLE 1, except that 0.5 g of a polydimethylsiloxane compound:(molecular weight: 400 to 700, Gelest, Inc., DMS-S12) having dimethylhydroxysilyl groups at both terminals, 0.5 g of diethoxysiloxane (Gelest, Inc., PSI-021) as a crosslinking promoter and 1.5 g of a 33% aqueous solution of 3-(trihydroxysilyl)propanesulfonic acid were used. The highly flexible membrane was obtained. The evaluation results and the like of the membrane are given in Table 1.

Example 10

A membrane was prepared in the same manner as in EXAMPLE 9, except that the polydimethylsiloxane compound having dimethylhydroxysilyl groups at both terminals was replaced by 0.5 g of a polydimethylsiloxane-polydiphenylsiloxane copolymer (molecular weight: 900 to 1000, Gelest, Inc., PDS-1615) having hydroxysilyl groups at both terminals. The highly flexible membrane was obtained. The evaluation results and the like of the membrane are given in Table 1.

Example 11

A membrane was prepared in the same manner as in EXAMPLE 1, except that 0.1 g of a polydimethylsiloxane compound (molecular weight: 400 to 700, Gelest, Inc., DMS-S12) having dimethylhydroxysilyl groups at both terminals, 0.4 g of 1,8-bis(triethoxysilyl)octane (Gelest, Inc.), 0.5 g of diethoxysiloxane (Gelest, Inc., PSI-021) and 1.5 g of a 33% aqueous solution of 3-(trihydroxysilyl)propanesulfonic acid were used. The highly flexible membrane was obtained. The evaluation results and the like of the membrane are given in Table 1.

Example 12

A membrane was prepared in the same manner as in EXAMPLE 1, except that 0.7 g of 1,8-bis(triethoxysilyl) octane (Gelest, Inc.), 0.2 g of diethoxysiloxane (Gelest, Inc., PSI-021) and 2.3 g of a 33% aqueous solution of 3-(trihydroxysilyl)propanesulfonic acid were used. The highly flexible membrane was obtained. The evaluation results and the like of the membrane are given in Table 1.

Example 13

A membrane was prepared in the same manner as in EXAMPLE 1, except that 0.6 g of bis[3-(triethoxysilyl)propyl]tetrasulfide (Gelest, Inc. SIB1825.0), 1.1 g of bis3-(triethoxysilyl)octane and 0.3 g of 1N hydrochloric acid were used, and the water washing step was saved. The membrane was immersed in 20 g of a 30% aqueous solution of hydrogen peroxide at 50° C. continuously for 3 hours.

The membrane was withdrawn from the system, after it was cooled, immersed in 1N sulfuric acid over a night, and then washed in a flow of water at 60° C. for 2 hours. The evaluation results and the like of the membrane are given in Table 1.

Example 14

A membrane was prepared in the same manner as in EXAMPLE 13, except that 0.6 g of bis3-(triethoxysilylpropyl)disulfide (Shin-etsu Silicones KBE886B) and 1.3 g of bis(triethoxysilyl)octane were used. The evaluation results and the like of the membrane are given in Table 1.

Example 15

1,22-bis(triethoxysilyl)docosane was synthesized using 1,21-docosadiene (Fluka) as the starting compound in a manner similar to that for EXAMPLE 6, and its structure was confirmed by NMR analysis. A membrane was prepared in the same manner as in EXAMPLE 8, except that bis(triethoxysilyl)octane was replaced by 1,22-bis(triethoxysilyl)docosane prepared above. The evaluation results and the like of the membrane are given in Table 1.

Example 16

Bis(ethoxydimethylsilyl)octane was synthesized using octadiene and ethoxydimethylsilane (Gelest, Inc.) as the starting compounds in a manner similar to that for EXAMPLE 6, and its structure was confirmed by NMR analysis. A membrane was prepared in the same manner as in EXAMPLE 8, except that bis(triethoxysily)octane was replaced by an equimolar mixture of bis(diethoxymethylsilyl)octane and bis(ethoxydimethylsilyl)octane prepared above. The evaluation results and the like of the membrane are given in Table 1.

Example 17

A membrane was prepared in the same manner as in EXAMPLE 8, except that 3-mercaptopropyltrimethoxysilane was replaced by 3-mercaptopropyltrimethoxysilane oligomer (Shin-etsu Silicones X-41-1805). The oligomer's molar equivalent was set at the same level as that of the mercapto group. The evaluation results and the like of the membrane are given in Table 1.

Example 18

A membrane was prepared in the same manner as in EXAMPLE 8, except that 3-mercaptopropyltrimethoxysilane was replaced by 3-mercaptopropyltrimethoxysilane-methyltrimethoxysilane cooligomer (Shin-etsu Silicones X-41-1810). The cooligomer's molar equivalent was set at the same level as that of the mercapto group. The evaluation results and the like of the membrane are given in Table 1.

Example 19

(Synthesis of 3-mercaptopropyltrimethoxysilane Polymer)

10 mmols of 3-mercaptopropyltrimethoxysilane (Gelest, Inc.) was incorporated with 1N hydrochloric acid and 1 mL of ethanol, where quantity of the hydrochloric acid was set to have 15 mmols of water, and the mixture was stirred at room temperature for 10 minutes. It was then stirred on a hot plate kept at 80° C. continuously for 2 hours. Part of the resulting viscous liquid was analyzed by GPC (JASCO Corp., Column: TOSOH Corp.) for molecular weight. It had a weight-average molecular weight of around 5,000 as polystyrene. It was diluted with acetone to 20% by weight, and filtered by a 0.45 μm PTFE membrane filter (Toyo Roshi), to obtain the polymer.

(Preparation of the Polymer Film)

A membrane was prepared in the same manner as in EXAMPLE 17. The evaluation results and the like of the membrane are given in Table 1.

Example 20

An oligomer was prepared in the same manner as in EXAMPLE 19, except that 3-mercaptopropylmethyldimethoxysilane (Gelest, Inc.) was used as the starting compound and mixture was stirred under heating for 30 minutes. It had a molecular weight of around 1,300. A membrane was prepared in the same manner as in EXAMPLE 19, except that the oligomer prepared above was used. The evaluation results and the like of the membrane are given in Table 1.

Example 21

1.0 g of a 70% isopropanol solution of zirconium tetra-1-propoxide (Wako Pure Chemical Industries) was incorporated beforehand with 0.5 g of ethylene glycol monoethyl ether to prepare a stable complex. Then, 0.7 g of bis(ethoxydimethylsilyl)octane was incorporated with 0.5 g of the stabilized zirconia complex solution. The mixture was stirred for 10 minutes, and incorporated with 0.2 g of bis(diethoxymethylsilyl)octane, 0.5 g of 3-mercaptopropyltrimethoxysilane and 0.3 g of 1N hydrochloric acid. It was made into a membrane in a manner similar to that for EXAMPLE 8. The membrane whitely turbid to some extent was obtained. The evaluation results and the like of the membrane are given in Table 1.

Example 22

A membrane was prepared in the same manner as in EXAMPLE 21, except that a 70% isopropanol solution of zirconium tetra-1-propoxide was replaced by that of titanium tetra-n-butoxide (Wako Pure Chemical Industries). The orange-colored membrane was obtained. The evaluation results and the like of the membrane are given in Table 1.

Example 23

A mixture of 11.0 g of 3-bromopropyltrimethoxysilane (Shin-etsu silicones) and 1.5 g of bis(triethoxysilyl)octane was incorporated with 0.3 g of 1N hydrochloric acid dissolved in 3.0 g of isopropanol. The resulting mixture was directly cast into a Petri dish of polystyrene (inner diameter: 9 cm), where it was left at room temperature for 24 hours, and heated at 80° C. for 12 hours in a saturated steam atmosphere and at 130° C. in an oven for 5 hours. The resulting membrane was washed in distilled water at room temperature for 1 hour. It was then immersed in a mixed solvent of 10 mL of ethanol and 10 mL of water, to which an aqueous solution of 2.5 g of sodium sulfite dissolved in 10 mL of water was added little by little, and the mixture was heated with moderate stirring to 90° C., at which it was held for 2 hours at 90° C. The membrane was withdrawn from the reaction effluent, washed with water sufficiently and immersed in water kept at 80° C., to obtain the membrane whitely turbid to some extent. It was immersed in 1N sulfuric acid over a night at room temperature. The evaluation results and the like of the membrane are given in Table 1.

Example 24

A membrane was prepared in the same manner as in EXAMPLE 1, except that 0.1 g of whiskers as short fibers (diameter: 0.3 to 0.6 µm, average length: 10 to 20 µm, aspect ratio: about 30, material: $K_2O \cdot 6TiO_2$, Otsuka Chemical TISMO) were further incorporated and the mixture was stirred by a homogenizer. The white, tough membrane was obtained. The evaluation results and the like of the membrane are given in Table 1.

Example 25

A 50 µm thick thirled, square-weave fabric of glass fibers (Nitto Boseki WEA05E) put on a Teflon® sheet was loaded with the same starting solution for the membrane as that used in EXAMPLE 1 using a roller in place of a Petri dish. Quantity of the solution loaded was set at 50 g/m², and rolling was carried out twice. Then, it was treated in the same manner as in EXAMPLE 1, to prepare the membrane. It showed no failure when subjected to the tensile strength test and bending test where it was exposed to cyclic load. The evaluation results and the like of the membrane are given in Table 1.

Example 26

A starting solution for the membrane was prepared in the same manner as in EXAMPLE 8, except that 0.5 g of whiskers as short fibers (diameter: 0.5 to 1.0 µm, average length: 10 to 30 µm, aspect ratio: about 20 to 30, material: $9Al_2O_3 \cdot 2B_2O_3$, Shikoku Corp. ALBOREX) were further incorporated and the mixture was stirred by a homogenizer. A 30 µm thick thirled, square-weave fabric of glass fibers (Nitto Boseki WEA05C) put on a Teflon® sheet was loaded with the above starting solution using a roller in place of a Petri dish. Quantity of the solution loaded was set at 50 g/m², and rolling was carried out twice. Then, it was treated in the same manner as in EXAMPLE 8, to prepare the membrane. It showed no failure when subjected to the tensile strength test and bending test where it was exposed to cyclic load, and was tough. The evaluation results and the like of the membrane are given in Table 1.

Example 27

The same 50 µm thick thirled, square-weave fabric of glass fibers (Nitto Boseki WEA05E) as that used for EXAMPLE 25 was immersed beforehand in an aqueous solution of trihydroxysilylpropane sulfonic acid (Gelest, Inc.) as a silane coupling agent for 1 hour, and the as-treated fabric, i.e., the fabric still containing the aqueous solution, was heated at 80° C. in an oven for 12 hours. The dried glass fibers were washed with water for 2 hours, to remove the surplus silane coupling agent. The fiber by itself had a conductivity of $3 \times 10^{-3}$ S/cm. A membrane was prepared using the glass fibers treated be proton-conducting in a manner similar to that for example 25. The membrane showed conditions similar to that prepared in EXAMPLE 25. The evaluation results and the like of the membrane are given in Table 1.

Example 28

A porous membrane of fluorine resin (Nihon Millipore membrane filter JG, pore diameter: 0.2 µm, thickness: 60 µm) put on a Teflon® sheet was loaded with the same starting solution for the membrane as that used in EXAMPLE 17 using a roller in place of a Petri dish. Quantity of the solution loaded was set at 50 g/m². Then, it was treated in the same manner as in EXAMPLE 17, to prepare the membrane. It showed no failure when subjected to bending or the like, and was good in handleability. The evaluation results and the like of the membrane are given in Table 1.

Example 29

A single-cell fuel cell was assembled using the membrane prepared in EXAMPLE 4, where the membrane put between gas diffusing electrodes (ETEK, loaded with 2.0 mg of platinum) was assembled in a single cell (Electrochem, membrane area: 5.25 cm²). The fuel cell working with hydrogen and oxygen supplied to the respective anode and cathode produced a voltage-current curve shown in FIG. 1, when its output was connected to an electronic load.

TABLE 1

| | Organic/inorganic composite, crosslinkable compound (C) | Carbon-containing organic chain in the organic/inorganic composite structure (A) | Starting compound for the structure (B) containing an acid group | Type of starting compound | Type of acid group |
|---|---|---|---|---|---|
| Example 1 | Bis(triethoxysilyl) octane | Octamethylene | 3-Trihydroxysilylpropanesulfonic acid | (D) | Sulfonic acid |
| Example 2 | Bis(triethoxysilyl) octane | Octamethylene | 3-Trihydroxysilylpropanesulfonic acid | (D) | Sulfonic acid |
| Example 3 | Bis(triethoxysilyl) octane | Octamethylene | 3-Trihydroxysilylpropanesulfonic acid | (D) | Sulfonic acid |
| Example 4 | Bis(diethoxymethylsilyl) octane | Octamethylene | 3-Trihydroxysilylpropanesulfonic acid | (D) | Sulfonic acid |
| Example 5 | Bis(triethoxysilyl) hexane | Hexamethylene | 3-Trihydroxysilylpropanesulfonic acid | (D) | Sulfonic acid |
| Example 6 | Bis(triethoxysilyl) tetradecane | Tetradecanethylene | 3-Trihydroxysilylpropanesulfonic acid | (D) | Sulfonic acid |
| Example 7 | Bis(triethoxysilyl) polydimethylsiloxane | Dimethylsiloxane | 3-Trihydroxysilylpropanesulfonic acid | (D) | Sulfonic acid |
| Example 8 | Bis(diethoxymethylsilyl) octane | Octamethylene | 3-Mercaptopropyltrimethoxysilane | (E) | Sulfonic acid |
| Example 9 | Polydimethylsiloxane with OH at the terminal | Dimethylsiloxane | 3-Trihydroxysilylpropanesulfonic acid | (D) | Sulfonic acid |
| Example 10 | Polydimethylsiloxane with OH at the terminal-polydiphenylsiloxane copolymer | Polydimethylsiloxane-polydiphenylsiloxane copolymer | 3-Trihydroxysilylpropanesulfonic acid | (D) | Sulfonic acid |
| Example 11 | Bis(triethoxysilyl)octane, Polydimethylsiloxane with OH at the terminal | Octamethylene, Dimethylsiloxane | 3-Trihydroxysilylpropanesulfonic acid | (D) | Sulfonic acid |
| Example 12 | Bis(triethoxysilyl) octane | Octamethylene | 3-Trihydroxysilylpropanesulfonic acid | (D) | Sulfonic acid |
| Example 13 | Bis(triethoxysilyl) octane | Octamethylene | Bis[3 (triethoxysilyl)propyl] tetrasulfide | (F) | Sulfonic acid |
| Example 14 | Bis(triethoxysilyl) octane | Octamethylene | Bis[3 (triethoxysilyl)propyl] disulfide | (F) | Sulfonic acid |
| Example 15 | Bis(triethoxysilyl) docosane | Docosanethylene | 3-Mercaptopropyltrimethoxysilane | (E) | Sulfonic acid |
| Example 16 | 1:1 Mixture of bis(diethoxymethylsilyl) octane + bis(ethoxydimethylsilyl) octane | Octamethylene | 3-Mercaptopropyltrimethoxysilane | (E) | Sulfonic acid |
| Example 17 | Bis(diethoxymethylsilyl) octane | Octamethylene | 3-Mercaptopropyltrimethoxysilane oligomer | (E) | Sulfonic acid |
| Example 18 | Bis(diethoxymethylsilyl) octane | Octamethylene | 3-Mercaptopropyltrimethoxysilane oligomer | (E) | Sulfonic acid |
| Example 19 | Bis(diethoxymethylsilyl) octane | Octamethylene | 3-Mercaptopropyltrimethoxysilane polymer | (E) | Sulfonic acid |
| Example 20 | Bis(diethoxymethylsilyl) octane | Octamethylene | 3-Mercapto-propyldimethoxymethylsilane oligomer | (E) | Sulfonic acid |
| Example 21 | Bis(diethoxymethylsilyl) octane + bis(ethoxydimethylsilyl) octane, Stabilized Zr complex | Octamethylene | 3-Mercaptopropyltrimethoxysilane | (E) | Sulfonic acid |
| Example 22 | Bis(diethoxymethylsilyl) octane + bis(ethoxydimethylsilyl) octane, Stabilized Ti complex | Octamethylene | 3-Mercaptopropyltrimethoxysilane | (E) | Sulfonic acid |
| Example 23 | Bis(triethoxysilyl) octane | Octamethylene | 3-Bromopropyltrimethoxysilane (+ Sodium sulfite, Made protonic) | (H) | Sulfonic acid |
| Example 24 | Bis(triethoxysilyl) octane | Octamethylene | 3-Trihydroxysilylpropanesulfonic acid | (D) | Sulfonic acid |
| Example 25 | Bis(triethoxysilyl) octane | Octamethylene | 3-Trihydroxysilylpropanesulfonic acid | (D) | Sulfonic acid |
| Example 26 | Bis(triethoxysilyl) octane | Octamethylene | 3-Mercaptopropyltrimethoxysilane | (E) | Sulfonic acid |
| Example 27 | Bis(triethoxysilyl) octane | Octamethylene | 3-Trihydroxysilylpropanesulfonic acid | (D) | Sulfonic acid |
| Example 28 | Bis(diethoxymethylsilyl) octane | Octamethylene | 3-Mercaptopropyltrimethoxysilane oligomer | (E) | Sulfonic acid |

TABLE 1-continued

| | (C)/(B) molar ratio in the starting mixture | Evaluation (1) Bending test | Evaluation (2) Conductivity at 60° C. (s/cm) | Evaluation (2) Conductivity at 140° C. (s/cm) | Evaluation (3) Heat resistance at 140° C. | Remarks |
|---|---|---|---|---|---|---|
| Example 1 | 5:5 | ○ | $4.6 \times 10^{-2}$ | $3.0 \times 10^{-2}$ | ○ | |
| Example 2 | 7:3 | ○ | $1.0 \times 10^{-2}$ | $8.9 \times 10^{-1}$ | ○ | Tough |
| Example 3 | 4:6 | ○ | $7.5 \times 10^{-2}$ | $5.5 \times 10^{-2}$ | ○ | Slightly fragile |
| Example 4 | 5:5 | ○ | $2.2 \times 10^{-2}$ | $1.8 \times 10^{-2}$ | ○ | Highly flexible |
| Example 5 | 5:5 | ○ | $5.0 \times 10^{-2}$ | $3.2 \times 10^{-2}$ | ○ | Slightly fragile |
| Example 6 | 5:5 | ○ | $9.2 \times 10^{-3}$ | Not measured | ○ | |
| Example 7 | Details not known | ○ | $8.7 \times 10^{-3}$ | Not measured | ○ | Highly flexible, Whitely turbid |
| Example 8 | 3:7 | ○ | $5.5 \times 10^{-2}$ | $6.5 \times 10^{-2}$ | ○ | Mercapto group oxidized with peracetic acid |
| Example 9 | 3:7 | ○ | $4.0 \times 10^{-2}$ | $3.5 \times 10^{-2}$ | ○ | Flexible |
| Example 10 | 1.5:8.5 | ○ | $3.8 \times 10^{-2}$ | $3.6 \times 10^{-2}$ | ○ | Flexible |
| Example 11 | 3:7 | ○ | $1.1 \times 10^{-1}$ | $9.6 \times 10^{-2}$ | ○ | Crosslinking agent (G) incorporated |
| Example 12 | 3:7 | ○ | $7.8 \times 10^{-2}$ | $8.2 \times 10^{-2}$ | ○ | Crosslinking agent (G) incorporated |
| Example 13 | 7:3 | ○ | $3.2 \times 10^{-2}$ | $3.5 \times 10^{-2}$ | ○ | Tetrasulfide group oxidized with H2O2 |
| Example 14 | 7:3 | ○ | $4.5 \times 10^{-2}$ | $4.3 \times 10^{-2}$ | ○ | Disulfide group oxidized with peracetic acid |
| Example 15 | 3:7 | ○ | $4.2 \times 10^{-2}$ | $3.5 \times 10^{-1}$ | ○ | Highly flexible |
| Example 16 | 3:7 | ○ | $3.9 \times 10^{-2}$ | $3.2 \times 10^{-2}$ | ○ | Highly flexible |
| Example 17 | 3:7 | ○ | $1.2 \times 10^{-1}$ | $9.8 \times 10^{-2}$ | ○ | Slightly fragile, Oligomer used |
| Example 18 | 3:7 | ○ | $6.8 \times 10^{-2}$ | $5.5 \times 10^{-2}$ | ○ | Oligomer used |
| Example 19 | 3:7 | ○ | $8.9 \times 10^{-2}$ | $8.0 \times 10^{-2}$ | ○ | Slightly fragile, Polymer used |
| Example 20 | 3:7 | ○ | $5.1 \times 10^{-2}$ | $4.4 \times 10^{-1}$ | ○ | Fairly flexible, Oligomer used |
| Example 21 | 3:7 | ○ | $3.3 \times 10^{-2}$ | $2.8 \times 10^{-2}$ | ○ | Fairly flexible, Crosslinking agent (G) incorporated |
| Example 22 | 3:7 | ○ | $2.7 \times 10^{-2}$ | $2.1 \times 10^{-2}$ | ○ | Fairly flexible, Crosslinking agent (G) incorporated |
| Example 23 | 5:5 | ○ | $1.7 \times 10^{-2}$ | $1.3 \times 10^{-2}$ | ○ | Flexible, Substitution adopted |
| Example 24 | 5:5 | ○ | $7.8 \times 10^{-2}$ | $8.9 \times 10^{-2}$ | ○ | White membrane, Tough |
| Example 25 | 5:5 | ○ | $1.8 \times 10^{-2}$ | $2.5 \times 10^{-2}$ | ○ | Very high resistance to bending stress |
| Example 26 | 3:7 | ○ | $5.6 \times 10^{-2}$ | $7.7 \times 10^{-2}$ | ○ | High resistance to bending stress, Tough |
| Example 27 | 5:5 | ○ | $3.8 \times 10^{-2}$ | $5.5 \times 10^{-2}$ | ○ | Very high resistance to bending stress |
| Example 28 | 3:7 | ○ | $3.3 \times 10^{-2}$ | $7.2 \times 10^{-2}$ | ○ | High resistance to bending stress, Semitransparent, white membrane |

Comparative Example 1

An attempt was made to harden the membrane in the same manner as in EXAMPLE 1, except that 1,8-bis(triethoxysilyl)octane was replaced by 1.0 g of tetraethoxysilane. This, however, failed to produce a measurable, self-sustaining membrane, only giving fine pieces. The product could not be measured for each evaluation item. The evaluation results and the like of the membrane are given in Table 2.

Comparative Example 2

A membrane was prepared in the same manner as in EXAMPLE 1, except that 1,8-bis(triethoxysilyl)octane was not used, but only 3.0 g of a 33% aqueous solution of 3-(trihydroxysilyl)propanesulfonic acid was incorporated. This failed to produce a hardened membrane, because the solution was kept fluid. The product could not be measured for each evaluation item. The evaluation results and the like of the membrane are given in Table 2.

Comparative Example 3

An attempt was made to harden the membrane in the same manner as in EXAMPLE 1, except that 1,8-bis(triethoxysilyl)octane was replaced by octyltriethoxysilane. This, however, failed to produce a measurable, self-sustaining membrane, only giving a very fragile, thin membrane. The product was soluble in water, and could not be measured for each evaluation item. The evaluation results and the like of the membrane are given in Table 2.

Comparative Example 4

A Nafion 117 membrane, a commercial electrolytic membrane for PEFCs, was directly used. The evaluation results and the like of the membrane are given in Table 2.

140° C., showing essentially no deformation. It is also confirmed that the membrane of the present invention is applicable to power generation by a fuel cell (EXAMPLE 29). These performances cannot be realized unless a membrane satisfies the requirement of simultaneously containing the (a) and (b) structures as the essential condition for the present invention. For example, it is self-evident that a membrane only containing an organic/inorganic hybrid structure (A) shows no proton conductivity in the least, although not demonstrated by a comparative example.

It is also apparent, as shown in Table 2, that formation of a membrane in itself is difficult using an acid-containing structure (B) alone (COMPARATIVE EXAMPLE 2). Moreover, an organic/inorganic hybrid structure (A) free of carbon-containing structure as a soft component gives a glassy membrane, which is difficult to handle and, at the same time, cannot have a large area (COMPARATIVE EXAMPLE 1). Still more, an organic/inorganic hybrid structure (A) free of bond which connects the crosslinked segments to each other only gives a membrane soluble in water, even if it has a soft component, as pointed out by Poinsignon et al. (COMPARATIVE EXAMPLE 3).

TABLE 2

|  | Organic/inorganic composite, crosslinkable compound (C) | Carbon-containing organic chain in the organic/inorganic composite structure (A) | Starting compound for the structure (B) containing an acid group | Type of starting compound | Type of acid group |
|---|---|---|---|---|---|
| Comparative Example 1 | (Tetraethoxysilane) | Not used | 3-Trihydroxysilylpropanesulfonic acid | (D) | Sulfonic acid |
| Comparative Example 2 | Not used | Not used | 3-Trihydroxysilylpropanesulfonic acid | (D) | Sulfonic acid |
| Comparative Example 3 | Octyltriethoxysilane | Octamethylene | 3-Trihydroxysilylpropanesulfonic acid | (D) | Sulfonic acid |
| Comparative Example 4 | Nafion117 | — | — | — | Sulfonic acid |

|  | (C)/(B) molar ratio in the starting mixture | Evaluation (1) Bending test | Evaluation (2) Conductivity at 60° C. (s/cm) | Evaluation (2) Conductivity at 140° C. (s/cm) | Evaluation (3) Heat resistance at 140° C. | Remarks |
|---|---|---|---|---|---|---|
| Comparative Example 1 | 8:2 | X | Measurement is impossible | Measurement is impossible | Measurement is impossible | Fine pieces |
| Comparative Example 2 | 0:10 | X | Measurement is impossible | Measurement is impossible | Measurement is impossible | Membrane not formed |
| Comparative Example 3 | 5:5 | X | Measurement is impossible | Measurement is impossible | Measurement is impossible | Soluble in water |
| Comparative Example 4 | — | ◯ | $1.2 \times 10^{-1}$ | $2.2 \times 10^{-2}$ | X | Greatly deformed |

It is apparent, as shown in Table 1, that a proton-conducting membrane can simultaneously achieve high proton conductivity and heat resistance, when it comprises (a) an organic/inorganic hybrid structure (A) covalently bonded to 2 or more silicon-oxygen crosslinks and, at the same time, having a carbon atom, and (b) an acid containing structure (B) having an acid group, covalently bonded to a silicon-oxygen crosslink and having an acidic group (EXAMPLES 1 to 28). It is particularly noted that they produce very good results in the heat resistance test (Evaluation 3) conducted at As discussed above, it is essential for the proton-conducting membrane of the present invention to comprise both (a) an organic/inorganic hybrid structure (A) covalently bonded to 2 or more silicon-oxygen crosslinks and, at the same time, having a carbon atom, and (b) an acid containing structure (B) having an acid group covalently bonded to a silicon-oxygen crosslink and having an acidic group, in order to be durable at high temperature. A membrane can be self-sustaining to stably exhibit proton conductivity from low to high temperature and, at the same time, to be bendable.

A fluorine-based membrane (COMPARATIVE EXAMPLE 4), which has been used as a representative electrolytic membrane, suffers a large, irreversible deformation, although showing a high initial conductivity and relatively high conductivity after being exposed to high temperature for extended periods. The deformed membrane becomes hard and fragile, when dried. These observations clearly indicate that this membrane can not be directly applied to a PEFC serviceable at high temperature.

INDUSTRIAL APPLICABILITY

The present invention provides a crosslinkable, proton-conducting membrane having a crosslinked structure by a silicon-oxygen bond, well serviceable at high temperature by satisfying the requirements of comprising (a) an organic/inorganic hybrid structure (A) covalently bonded to 2 or more silicon-oxygen crosslinks and, at the same time, having a carbon atom, and (b) an acid containing structure (B) having an acid group, covalently bonded to a silicon-oxygen crosslink and having an acidic group.

The membrane of the present invention can increase operating temperature to 100° C. or higher for a PEFC, which has been attracting much attention recently, and hence can improve power generation efficiency and reduce poisoning of the catalyst by CO. Moreover, a fuel cell operating at high temperature allows to utilize its waste heat for cogeneration to produce power and heat, thus drastically enhancing its total energy efficiency.

What is claimed is:

1. A proton conducting membrane having a crosslinked structure by the silicon-oxygen bond, wherein said proton conducting membrane comprises
    (a) an organic/inorganic hybrid structure (A) covalently bonded to 2 or more silicon-oxygen crosslinks and, having a carbon atom, and
    (b) an acid containing structure (B) having an acid group, covalently bonded to a silicon-oxygen crosslink and having a sulfonic acid group, wherein the structure in which said sulfonic acid is bound to said crosslink is free of aromatic ring.

2. The proton conducting membrane according to claim 1, wherein said organic/inorganic hybrid structure (A) is represented by the general formula (1):

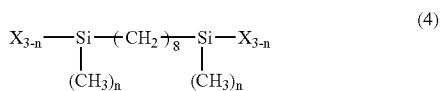

(1)

(wherein, X is an —O— bond or OH group involved in the crosslinking; $R^1$ is a carbon-containing group of 1 to 50 carbon atoms; $R^2$ is methyl, ethyl, propyl or phenyl group; and "n" is an integer of 0, 1 or 2).

3. The proton conducting membrane according to claim 2, wherein $R^1$ in the general formula (1) is a hydrocarbon group.

4. The proton conducting membrane according to claim 3, wherein $R^1$ in the general formula (1) has a structure represented by the general formula (3):

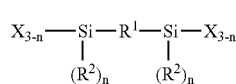

(3)

(wherein, "n" is an integer of 1 to 30).

5. The proton conducting membrane according to claim 4, wherein said organic/inorganic hybrid structure (A) is represented by the general formula (4):

(4)

(wherein, X is an —O— bond or OH group involved in the crosslinking; and "n" is an integer of 0, 1 or 2).

6. The proton conducting membrane according to claim 2, wherein $R^1$ in the general formula (1) has a siloxane structure.

7. The proton conducting membrane according to claim 6, wherein $R^1$ in the general formula (1) is represented by the general formula (5):

(5)

(wherein, $R^5$ and $R^6$ are each methyl, ethyl, propyl or phenyl, which may be the same or different; and "n" is an integer of 1 to 20).

8. The proton conducting membrane according to claim 1, wherein said structure (B) containing an acid group is represented by the general formula (2):

$$X_{3-m}-Si-R^3 \atop | \atop (R^4)_m$$ (2)

(wherein, X is an —O— bond or OH group involved in the crosslinking; $R^3$ is a molecular chain group having at least one sulfonic acid group; $R^4$ is methyl, ethyl, propyl or phenyl group; and "m" is an integer of 0, 1 or 2).

9. The proton conducting membrane according to claim 8, wherein $R^3$ in the general formula (2) is represented by the general formula (6):

(6)

(wherein, "n" is an integer of 1 to 20).

10. The proton conducting membrane according to claim 9, wherein "n" in the general formula (6) is 3.

11. The proton conducting membrane according to one of claims 1 to 10 which is further composited with a fibrous material (I).

12. The proton conducting membrane according to claim 11, wherein said fibrous material (I) is surface-treated with a silane coupling agent to have a proton-conductive surface.

13. The proton conducting membrane according to claim 11, wherein said fibrous material (I) is composed of glass fibers.

14. The proton conducting membrane according to claim 11, wherein said fibrous material (I) is composed of a short fibrous material (J) and/or long fibrous material (K).

15. The proton conducting membrane according to claim 14, wherein said long fibrous material (K) is composed of glass fibers in the form of woven fabric, non-woven fabric or glass fiber paper produced by a paper-making process.

16. The proton conducting membrane according to claim 15, wherein said long fibrous material (K) has a thickness of 300 μm or less.

17. The proton conducting membrane according to claim 11, wherein said short fibrous material (J) is incorporated at 1 to 75% by weight on the organic/inorganic hybrid structure (A) and acid-containing structure (B) totaled.

18. The proton conducting membrane according to claim 14, wherein said short fibrous material (J) is composed of whiskers (L) and/or short glass fibers (M).

19. The proton conducting membrane according to claim 18, wherein said whiskers (L) have a diameter of 0.1 to 3 μm, length of 1 to 20 μm and aspect ratio of 5 to 100.

20. A fuel cell which uses the proton conducting membrane according to claims 1 to 11.

* * * * *